United States Patent [19]

Cook

[11] 4,434,132
[45] Feb. 28, 1984

[54] POWER SUPPLY WITH NUCLEAR REACTOR

[75] Inventor: Bruce M. Cook, Pittsburgh, Pa.

[73] Assignee: Westinghouse Electric Corp., Pittsburgh, Pa.

[21] Appl. No.: 252,515

[22] Filed: Apr. 9, 1981

[51] Int. Cl.³ .............................................. G21C 17/00
[52] U.S. Cl. ..................................... 376/259; 376/215
[58] Field of Search ............... 376/259, 215, 216, 217; 371/36; 364/184, 186

[56] References Cited

U.S. PATENT DOCUMENTS

| | | | |
|---|---|---|---|
| 3,424,652 | 1/1969 | Oehmann | 376/259 |
| 3,425,903 | 2/1969 | Bevilacqua | 376/215 |
| 3,437,556 | 4/1969 | Bevilacqua et al. | 376/259 |
| 3,483,081 | 12/1969 | Sparks et al. | 376/216 |
| 3,665,173 | 5/1972 | Bouricius et al. | 371/36 |
| 3,855,590 | 12/1974 | Neuner | 376/259 |
| 3,888,772 | 6/1975 | Neuner | 376/259 |
| 3,892,954 | 7/1975 | Neuner | 371/36 |
| 3,940,309 | 2/1976 | Imperiali | 376/216 |
| 4,054,486 | 10/1977 | Lefebvre et al. | 376/215 |
| 4,060,716 | 11/1977 | Pekrul et al. | 376/259 |
| 4,118,792 | 10/1978 | Struger et al. | 364/184 |
| 4,200,864 | 4/1980 | Gillet et al. | 376/215 |
| 4,255,234 | 3/1981 | Neuner et al. | 376/259 |
| 4,263,580 | 4/1981 | Sato et al. | 364/186 |
| 4,292,129 | 9/1981 | Barry | 376/259 |

OTHER PUBLICATIONS

Sutherland, "Distributed Control Systems . . . ", ISA National Conf., (10/77), pp. 107-111.
Cook, "Use of Fault Tree Analysis in Design of Westinghouse Microprocessor Based Reactor Triplogic", ANS Topical Meeting, L.A., Ca., (5/78).
Bruno et al., IEEE PES Winter Meeting, N.Y., N.Y., (2/3-8/80), "Microprocessors in Nuclear Power Plant Protection Systems".
Gallager et al., "System Architecture for Microprocessor Based Protection System", IAEA/NPPCI Meeting at Nuremburg, Germany, pp. 311-320, (5/76).
Madera et al., "Design of Internal Architecture for Westinghouse Microprocessor Based Protection System", IAEA Symposium Cannes, France, pp. 43-54, (4/78).
Lecocq et al., "Microprocessor Based Integrated Protection System", Int. Meeting on NPR Safety, Brussels, Belgium, 10/78, pp. 579-584.
Rao et al., "A Microprocessor Based Integrated Protection System for Nuclear Power Plants", ISBN 87664-436-1, (5/79), Atlanta, Ga., pp. 161-170.

Primary Examiner—Sal Cangialosi
Attorney, Agent, or Firm—Daniel C. Abeles

[57] ABSTRACT

Each parameter of the processes of the nuclear reactor and of the components of a power supply which convert the thermal energy generated by the reactor into electrical power is monitored by a set of four like sensors. One each of the unlike sensors which monitor the different parameters is contained in a reactor-trip logic channel. Each such unlike sensor is referred to here as a "local sensor". Each channel is interlocked with the other three channels and receives the signals sensed by the other three sensors, herein called "remote sensors". Each channel also includes means for processing the signals from the local and remote sensors. The apparatus also includes means for tripping the reactor to deenergize or trip the control rod drive and insert the control rods fully into the core so that the reactor stops supplying power. The apparatus normally operates on a "two out of four" configuration. This assumes that all sensors are in normal operating condition. To achieve this purpose, eight circuit breakers are provided. Two breaker contactors are controlled by each channel. The control is through the undervoltage relays of the respective breakers. To trip the reactor, it is necessary that at least four breaker contactors be opened by operation of two channels.

32 Claims, 13 Drawing Figures

POWER SUPPLY WITH NUCLEAR REACTOR

BACKGROUND OF THE INVENTION

This invention relates to power-supply apparatus in which the power is derived from the energy generated in a nuclear reactor. Such apparatus is sometimes referred to as a nuclear-reactor power-supply plant. This invention has particular relationship to such apparatus in which there are integrated facilities for preventing the reactor from operating when off-normal conditions occur in the apparatus. The invention was created to deal with the operation of these facilities as part of the power supply apparatus.

In the interest of facilitating the understanding of the invention by reference to concrete concepts, this application confines itself predominantly to a powersupply in which the thermal energy is developed by a pressurized-water reactor (PWR). This invention is applicable to reactors of other types including boiling-water reactors (BWR), liquid-metal coolant and gas-coolant reactors and the application of this invention or its principles to such other reactors is intended to be within the scope of this invention and of any patent which will issue on or as a result of this application.

The power-supply apparatus with which this invention concerns itself includes in addition to the nuclear reactor, components for converting the thermal energy generated by the reactor into electrical energy. Typically, the principal such components for a pressurized water reactor are the pressurizer, the steam generators, the turbine, the electrical generator, the condenser and their associated parts.

The nuclear reactor and these components, while in operation, have processes each of which has one or more paraeters. There may be as many as 18 or more of these parameters. The most notable among the parameters are the neutron flux, the power generated by the reactor, the reactor-coolant temperatures, the pressurizer water level and pressure, the steam-generator feedwater level and the pressure of its steam, the feedwater flow and others. There may also be categorical parameters, such as the status of a switch, whether it is closed or open, or the status of a pump, whether it is on or off. It is necessary that these parameters be monitored reliably and for this purpose a plurality of like sensors are provided for monitoring each parameter. The use of more than one sensor for each parameter is a redundancy but this practice of redundancy is adopted in the interest of achieving optimum reliability. The aggregate of like sensors which monitor each parameter are referred to in this application as a set or sensors.

Generally, it may be assumed that there are n sensors in a set. When a sensor is being tested or is subject to maintenance or is disabled, it is taken out of service, a sensor which is taken out of service in this way is said to be bypassed. In case of a bypass, only unbypassed sensors for the parameter involved, i.e., of the set involved, are available to monitor this parameter. When the sensors in service sense an off-normal parameter, the control rods are inserted fully into the core of the reactor to prevent the reactor from supplying thermal power by reducing substantially its neutron flux. Within the scope of this invention, the neutron flux may be reduced by increasing the shim in addition to inserting rods or by increasing the shim alone adequately. This operation is referred to here as tripping the reactor or as tripping the power-supply apparatus. This application also refers to the tripping of a circuit breaker. Reference to the tripping of a breaker should not be taken to mean that a reactor is tripped. In practice, a reactor is not tripped if one sensor of a set of like sensors, senses an off-normal parameter because it is undesirable that tripping take place for spurious or transient off-normal sensing by a sensor. Such spurious tripping would unreasonably increase the down time. Generally, it may be assumed that an off-normal parameter must be sensed by at least m unbypassed like sensors of a set of n sensors ($n>m$) to produce a trip if the number of unbypassed sensors is greater than m. If the number of unbypassed sensors of a set is less than or equal to m, the off-normal parameter must be sensed, by the numnber of unbypassed sensors less 1 to produce a trip. The number m may be a constant or it may vary as sensors are taken out of service.

Typically, n is 4 and m is 2. If the number of unbypassed-like sensors is 2, a trip is produced by sensing of an off-normal parameter by only 1 sensor and if the number of unbypassed sensors is 1 there is an automatic trip.

The sensors and the cooperative elements which respond to the signals which the sensors sense are grouped in trip-logic channels. The grouping may be structural but it may also be functional with the actual components which carry out the functions intermingled. There are as many channels as there are sensors in each set of sensors, i.e., generally n channels. Each channel usually contains one each of the unlike sensors which sense the different parameters. Typically, there are four channels.

The reactor is tripped by opening or tripping circuit breakers. There are twice as many breakers as there are sensors per parameter, i.e., generally 2 n breakers. The contactors of the breakers are so interconnected that 2 m contactors must be opened to trip the reactor. Typically, there are four sensors per parameter, and four channels. There are eight breakers, two controlled by each channel, and the contactors of the breakers are so connected that four contactors must opened or tripped to trip the reactor. The action which takes place when one sensor of a set senses an off-normal parameter, is here called a partial trip of the reactor.

In the interest of facilitating the understanding of this invention, the following description of this invention will be confined to apparatus in which there are sets of four sensors per parameter and accordingly four channels and the reactor trip is actuated on a "two out four configuration". It is to be understood that the use of sets of more than four sensors per parameter and a different reactor trip configuration is within the scope of this invention.

When one of the sensors of a set is bypassed, it is necessary that this bypassing shall not result in a partial trip status of the reactor. If this occurred, the sensing of an off-normal parameter by another sensor of the set, i.e., by only one sensor, would trip the reactor.

It is desirable that the reliability of the sensing and tripping for the reactor be preserved without spurious tripping of the reactor notwithstanding that one or more sensors are bypassed. It is an object of this invention to preserve this reliability while avoiding spurious trips in the face of bypasses.

More generally stated, it is an object of this invention to provide for the monitoring of the parameters of a nuclear-reactor power-supply system with the reliability demanded by the nuclear-power art while minimizing the down-time of the reactor.

It has been suggested that a partial trip resulting from a bypass be precluded by closing additional breakers across the breakers in whose channel a sensor has been bypassed. Such an arrangement would require eight auxiliary breakers and would be complicated, costly to install and costly to maintain.

It is also an object of this invention to overcome the above-described drawback and to prevent the bypassing of a parameter sensor in nuclear-reactor, power-supply apparatus from having the same effect as a partial trip of the reactor in an uncomplicated manner at a lower installation and maintenance cost. It is also an object of this invention to provide nuclear-reactor, power-supply apparatus including uncomplicated, low-cost facilities maintainable at low cost, for preventing the bypassing of a parameter sensor from having the effect of a partial trip of the reactor and it is a further object of this invention to provide a method for operating such apparatus.

More generally, it is an object of this invention to provide nuclear-reactor power-supply apparatus in which the parameters shall be monitored with the reliability demanded by the nuclear art and which shall meet the above objects.

SUMMARY OF THE INVENTION

In accordance with this invention nuclear-reactor, power-supply apparatus is provided in which the bypassing of a sensor prevents the tripping or opening of the breaker controlled by the channel of this sensor, i.e., where this sensor is the local sensor. This object is accomplished by blocking the flow of a real trip signal to the control of the trip coil of the breaker in the event of bypass. Typically, the trip signal to the control of the coil of the undervoltage relay of the breaker is blocked. Specifically, the undervoltage relay is maintained energized in the normal operation of the apparatus. On the impressing of a trip signal, the relay is deenergized. When a sensor is bypassed, the signal deenergizing the relay is blocked.

An undervoltage relay and any of the other relays will here be referred to as "energized" when current is flowing through its coil. A relay will be referred to as "actuated" when it operates either on the interruption of the flow of current through its coil or on the initiation of flow of current through its coil.

This blocking function in accordance with this invention has the advantage that it precludes the necessity of complicating the apparatus by adding additional circuit breakers but it has, in addition, another important advantage. It lends itself readily to the interlocking of each sensor of a set, and the channel in which it is contained, with the other sensors of the same set and the other channels in which the like sensors are respectively contained. Thus, is it feasible to control the number of actual trips required to trip the reactor in dependance upon the number of sensors bypassed. This function also lends itself readily to error detection. In accordance with this invention, the sensors of each of the different sets are so interlocked that while the bypassing of only one sensor of a set prevents a partial trip of the cooperative breaker of the channel in which it is the local sensor, the bypassing of another sensor of the same set produces a partial trip. In other words, if one sensor is bypassed in its local channel and only one more sensor of the same set is also bypassed, the bypassing of these two sensors set trips the cooperative breakers of one of these channels producing a partial trip of the reactor. It does not in itself trip the reactor. The breaker configuration thus remains in a "safe" (with respect to single off-normal detection) condition no matter how many bypasses have been attempted.

The practice of this invention is implemented by computers, typically micro-computers or microprocessors. Each reactor trip function (or small group of closely related functions) is treated as a computational unit which receives parameter signal inputs and generates a reactor trip demand when the process conditions call for reactor trip. As stated, there are four redundant "channels", each of which containes a pair of reactor-trip breakers. The eight breakers are interconnected in such manner that the opening of any two pairs of breakers is sufficient to effect the reactor trip. Typically, this is accomplished by deenergizing the control-rod drive of the reactor and inserting the control rods in the core. In addition to this two-out-of-four (2/4) voting logic at the trip-breaker level, each of the individual trip functions, e.g. High Pressurizer Pressure Reactor Trip, is provided with its own 2/4 volting logic, thus agreement among process sensors of the same function is required to initiate the reactor trip.

There is provided a trip-logic system which performs the function level 2/4 voting logic implementing the bypass functions. As stated, the voting logic of 2/4 reverts to $\frac{2}{3}$ when there is one bypass and to $\frac{1}{2}$ with two bypasses. The reactor is tripped with more than two bypasses.

It has been proposed that the apparatus according to this invention shall include a trip-logic system with a single-processor (or microprocessor) trip-logic computer subsystem to perform the 2/4 volting logic. The 2/4 logic is performed by this system for each of the 18 or more parameters in accordance with the following logical expressions.

TRIP = PARTIAL TRIP and TRIP ENABLE or GLOBAL TRIP where:
PARTIAL TRIP = trip function output in a channel,
TRIP ENABLE = $\frac{1}{3}$PARTIAL TRIPS from other three remaining channels,
GLOBAL TRIP = $\frac{2}{3}$PARTIAL TRIPS from the other three channels.

In the above table $\frac{1}{3}$ should be read "1 in 3" and $\frac{2}{3}$ should be read "2 in 3". These logical expressions, which are expanded to include the bypass logic, are implemented in three steps:

1. The Trip-Logic Computer receives the PARTIAL TRIPS from other channel by means of the isolated data links and generates the TRIP ENABLE and/or GLOBAL TRIP signals.
2. The logical anding of the TRIP ENABLE with the PARTIAL TRIP is performed by a Logic Module (one Logic Module is provided for each parameter),
3. The results of step 2 or the GLOBAL TRIP are passed through an OR to a trip bus which is typically pulled down to ground potential causing the breaker bypass control to deenergize the reactor-trip breaker undervoltage coils.

The single-processor trip-logic system has the disadvantage that failure of the single processor in the trip logic computer will prevent the reactor trip from being generated in that channel because the GLOBAL TRIP and all of the TRIP ENBALE commands are generated by this processor. This is not a concern from the standpoint of the single failure criterion because the Trip Logic Computer has a redundant counterpart in each of the other three channels and only two of the computers are needed to actuate a reactor trip. However, since the life of the printed-circuit cards used for the processor is estimated to be less than 100,000 hours, it became necessary for continuous testing of the trip logic computer for the system to meet the reliability goal of $3.4 \times 10^{-7}$ probability of failure to trip on demand. This reliability goal was set to ensure that the apparatus will have the reliability conventionally demanded for such apparatus.

In accordance with this invention, a dual processor trip-logic computer system is provided for controlling each channel. One processor generates the globaltrip command and the other the trip-enable command. To improve the reliability of the transmission of status to the other channels, the data link transmitter is moved from the Communications Module to be directly driven by one of the trip-logic computers. It was determined by Fault Tree Analysis that to achieve the full reliability benefits of the dual-processor computer, it is necessary that the data transmission function be independent of the generation of the TRIP ENABLE commands, therefore, the processor which generates the GLOBAL-TRIP command also collects and transmits the status to the other channels. The connection between the trip-logic computer and the communications module remains by means of a shared memory cards to provide trip-logic system status to the plant computer for display and to the automatic test system. In addition to this division of functions, the actuation of the breaker-bypass control is separated from the communication of its status to prevent a single failure from actuating an automatic bypass and preventing the other channels from "seeing" that bypass.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF THE PREFERRED EMBODIMENTS

Figure 1:
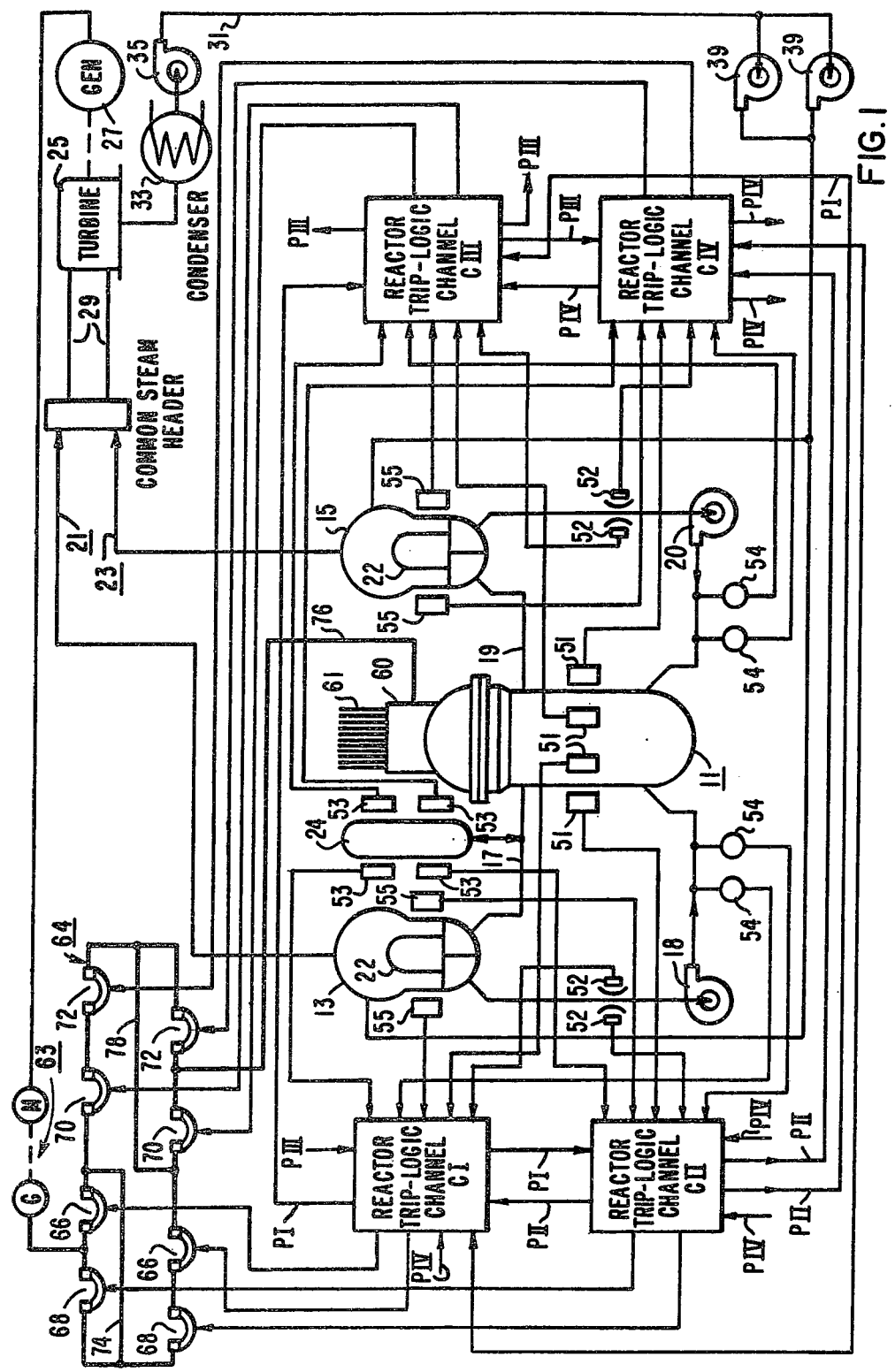
FIG. 1 is a diagram illustrative of an embodiment of this invention.

The apparatus shown in FIG. 1 is nuclear-reactor power-supply apparatus including a nuclear reactor 11 in thermal heat-exchange relationship with a plurality of steam generators 13 and 15. A primary loop, 17 and 19 respectively, each including a pump 18 and 20, thermally interconnects the reactor 11 and each of the generators 13 and 15. Coolant, typically pressurized water, flows through the core (not shown) of the reactor 11 and through the primary coils 22 of each of the generators 13 and 15. The heat derived by each primary loop 17 and 19 from the core vaporizes the water in each generator 13 and 15. A secondary loop 21 and 23 is associated with each generator 13 and 15 respectively. There is also a pressurizer 24, connected to loop 17 for controlling the pressure of the coolant.

The apparatus shown in FIG. 1 also includes a turbine 25 and an electrical generator 27 driven by the turbine 25. Each secondary loop 21 and 23 includes a first branch 29 for circulating steam from each steam generator 13 and 15 to drive the turbine 25 and a second branch 31 for circulating feedwater form the turbine 25 to the corresponding steam generator 13 and 15. Common ot the branches 31, in addition to turbine 25, is a condenser 33 for condensing the fluid from the turbine 25 and a condensate pump 35. Each feedwater branch 31 also includes feedwater pumps 39.

Typical nuclear-reactor power-supply apparatus as described briefly above is disclosed in U.S. Pat. No. 4,104,117 to Ernest A. Parziale et al. Parziale et al. discloses additional features of the apparatus which do not concern the instant invention and are not included in the interest of facilitating understanding of this invention This invention concerns itself with the tripping of the reactor 11 on the occurrence of off-normal operation as manifested by the parameters of the processes of the apparatus shown in FIG. 1. The reactor 11 includes control rods 61 movable into and out of the core by a drive 60. When the reactor is to be tripped, the drive 60 is actuated, typically deenergized, so that the control rods 61 are injected into the core. The control-rod drive is typically energized from a motor-generator set 63. The motor M of this set 63 is driven by the electric generator 27 or any other suitable supply. The generator G supplies the power for the drive 60 through circuit-breaker or disconnect assembly 64.

The circuit breaker 64 is controlled by reactor trip-logic channels CI, CII, CIII and CIV. The four-part redundancy of the channels lends the control the desired reliability. The channels CI-CIV each responds to the status of a plurality of sensors which sense different parameters of the reactor 11 and/or the components 13, 15, 17, 19, 25, 33, etc. by means of which the thermal energy generated by the reactor is converted into electrical power. Predominantly there are sets of four sensors for each parameter. Each sensor of each set enters its status intelligence into different ones of the channels. Typically 18 or more parameters are sensed. In the interest of not unnecessarily complicating FIG. 1, this view discloses only several of these sensors and in most cases, only two of the four sensors which are actually present. Those shown are the nuclear flux detectors 51, the reactor-coolant flow sensors 52, the pressurizer pressure sensors 53, the reactor-coolant temperature sensors 54, and the steam-generator feedwater-level sensors 55. Each of the sensors 51 through 55 and the others enters its status in a channel CI-CIV. The status entered may be normal, off-normal, or bypassed. Each of the channels CI-CIV receives not only the intelligence of each of its local sensors but also the intelligence of each of the remote sensors of the other three channels. This intelligence flows between the channels through optic fiber conductors. To indicate this interconnection the sets of lines PI, PII, PIII and PIV are shown in FIG. 1. Each of these lines represent a single fiber-optic conductor over which are multiplexed signals corresponding in number to the number of parameters sensed. The Roman numeral after the P in each case indicates that the signal flows from a channel CI-CIV identified by the same Roman numeral. From each channel CI-CIV to another channel there is one fiberoptic conductor carrying all sensing intelligence from the first channel to the second channel and another fiberoptic conductor carrying all intelligence from the second channel to the first channel.

Each of the channels CI-CIV controls a pair of disconnect contactors 66, 68, 70 and 72, respectively, of the breaker assembly 64. The opening of two sets of breakers; i.e., four contactors is required to disconnect generator G from the drive 60. For example, if only contactors 66 are opened, current can flow from generator G, through contactor 68, conductor 74, contactors 70 and 72, conductor 76 to drive 60. If only contactors 70 are opened, the flow is from G through 68 and 66, conductor 78, contactor 72 conductor 76 to drive 60. The opening of two sets of contactors, for example, 66 and 68, interrupts both of the alternative branches which feed conductor 76.

Figure 2:
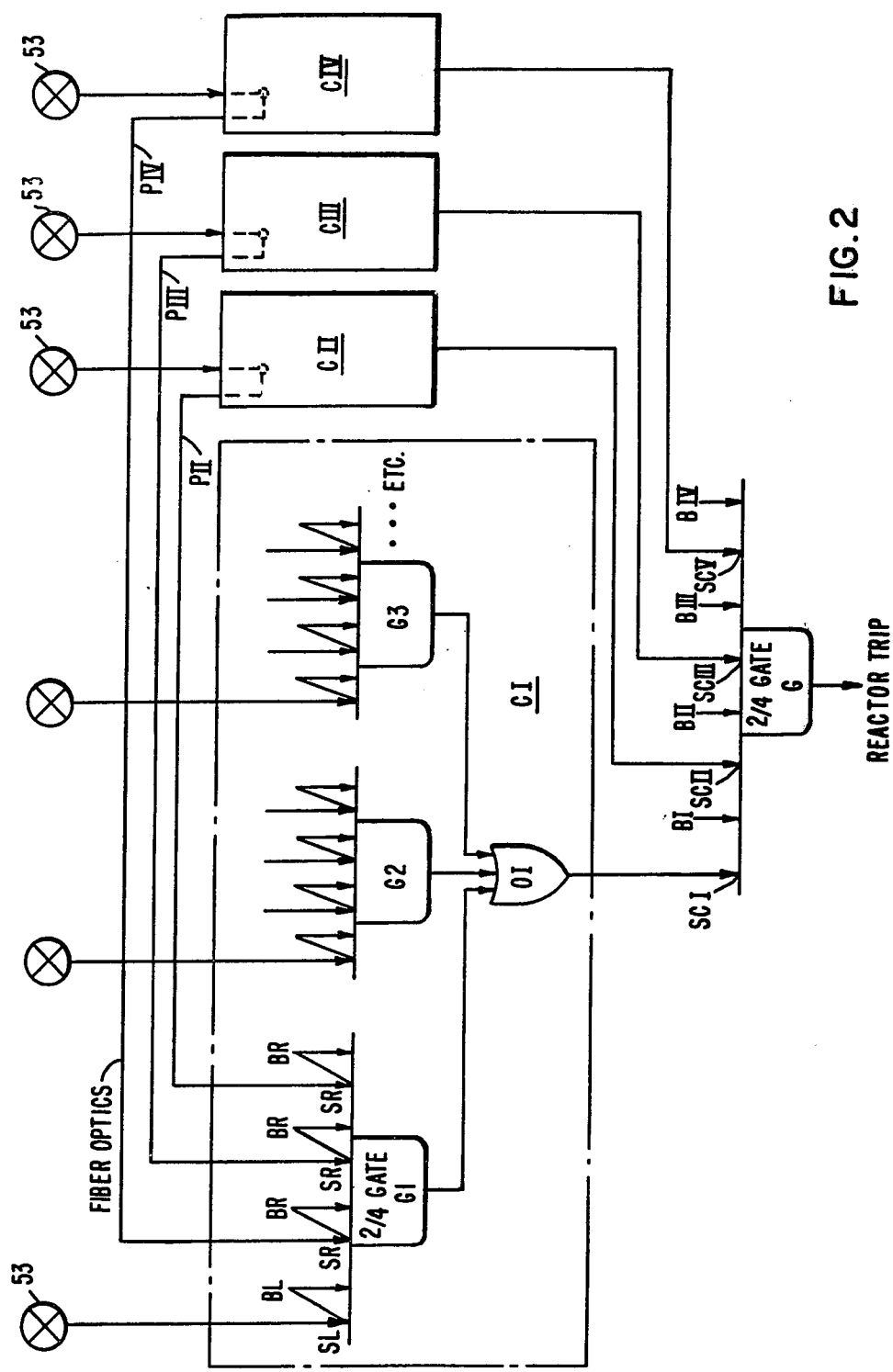
FIG. 2 is an abstract block diagram showing in broad outline how the invention shown in FIG. 1 functions.

FIG. 2 is an abstract logic diagram showing basically the manner in which the sensors control the trippers of the reactor and the manner in which the sensors are interlocked in their sensing functions. For purpose of illustration, only one sensor, the pressurizer pressure sensor is shown in all four channels CI, CII, CIII and CIV. The functional elements of CI are shown. The other channels CII, CIII and CIV have similar functional elements. Channel CI includes a plurality of gates G1, G2, G3 . . . , a separate gate for each parameter. A sensor connected directly to a gate of a channel is called here a "local" sensor; i.e., local to the channel. Local sensors are shown connected to gates G1, G2, G3, these sensors sense different paramaeters. Each gate G1 . . . also receives intelligence of the status of the other sensors of the same set from the other channels CII, CIII and CIV. These other sensors are referred to as remote sensors for each channel. This intelligence is supplied through fiber optic pipes PII, PIII, PIV so that there is no electrical interaction between the channels. Each gate is also supplied with bypass intelligence for each sensor. Specifically, each gate G1, etc. receives 4 sensor signals and 4 bypass signals. The local signal inputs and local bypass inputs are labeled SL and BL and the remote inputs are labeled SR and BR respectively. Each gate G1, etc. produces an output signal, a logic 1, if the appropriate number of sensors sense the corresponding off-normal parameter or if the gate receives intelligence that the local sensor and one of the remote sensors sensing the corresponding parameter is bypassed.

If no sensors are bypassed, the gate operates on a 2/4 basis as indicated for G1. In case of one sensor bypass, the bypassed sensor is taken out of service reducing the number of inputs by 1. If one sensor is bypassed, there are three sensor inputs left and the gate operates on a 2/3 basis. If 2 sensors are bypassed, the gate operates on a ½ basis and if 3 inputs are bypassed, the gate operates on a 0/1 basis.

One or more sensors in a channel may be bypassed or all sensors in a channel may be bypassed. When all sensors of a channel are bypassed, the bypass is referred to herein as a "global" bypass.

The outputs of the gate G1, etc. for each channel are supplied to an OR, labeled OI, etc. The outputs of OR OI is supplied to a reactor trip gate G. The gate G operates on 2/4 basis. The reactor trip gate G receives signals from the 4 channels, 4 signals giving intelligence of the normality or off-normality of the parameters monitored by each channel and four signals giving intelligence of the bypass status of the channel. In the interest of facilitating the explanation, it is assumed that gate G receives 1's for off-normal sensing by a parameter of a channel or of a bypass in a channel and 0's for normal sensing of a parameter or of no bypass in a channel. The sensor inputs are labeled SCI, SCII, SCIII and SCIV and the bypass inputs BI, BII, BIII and BIV.

If the sensors of the four channels sense no off-normal parameter, 0's are entered at inputs SCI-SCIV. If there are no bypasses in the channels, 0's are entered on BI-BIV. The reactor is not tripped and the operation of the apparatus is normal. Assume that only the local sensor of CI senses an off-normal parameter while there are no bypasses. A 1 is entered on input SL of gate G1 and 1's are entered on the remote SR, inputs of the corresponding gates (not shown) of the other channels. The outputs of the G1 and the other gates are O and the reactor is not tripped. Assume that the local sensor of CI and a remote sensor of CI, sensing a signal coming from say CII, sense an off-normal parameter while no bypasses are present. Input SL and one input SR of gate G1 receive 1's, an input SL and an input SR of another channel also receive 1's and SR inputs of the remaining two channels receive 1's. Two inputs SCI-SCIV receive 1's and the reactor is tripped.

Now assume that the local sensor of CI is bypassed. The entry of a trip signal through gates G1 and G in channel CI is blocked. Trip signals can be entered through the other three channels and the configuration is ⅔ . A local bypass and a remote bypass entered in one channel prevents a remote bypass and a local bypass from being entered in another channel. In this case, a 1 is entered on one of the inputs BI-BIV of gate G signifying a partial trip of the reactor. Entry of another 1 on gate G resulting from a trip signal in one of the other two channels, trips the reactor. The configuration is ½ . If a remote and local bypass are entered in three channels, ones are entered on two inputs BI-BIV and the reactor is tripped. The configuration is 01.

Figure 3:
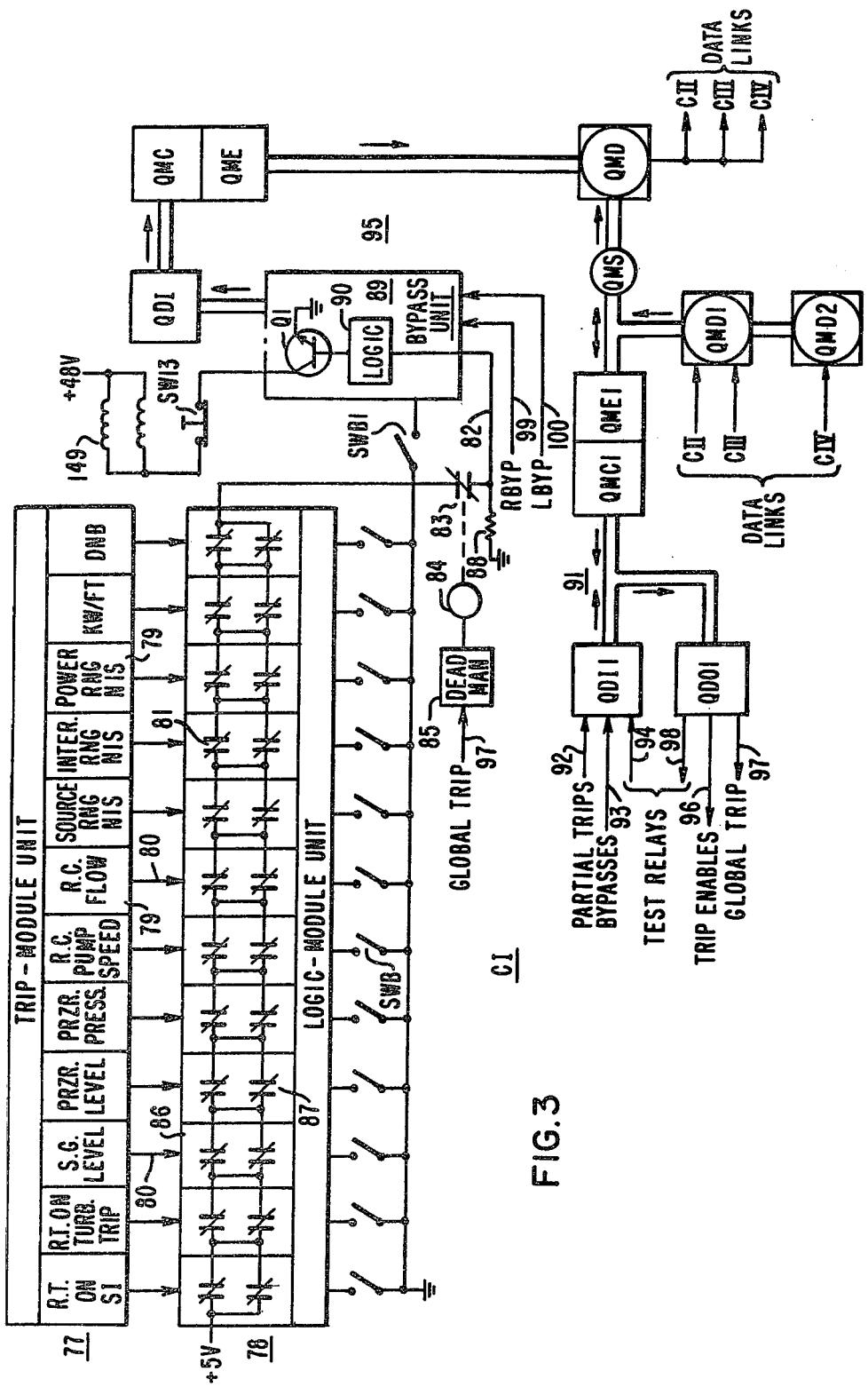
FIG. 3 is a block diagram showing the principle components of a reactor trip-logic channel which processes the intelligence received from the parameter sensors.

FIG. 3 shows in some detail a typcial reactor triplogic channel in which the trip is operated. It is assumed that the channel is channel CI. The trip functions are performed by modules. There is a trip-module unit 77 and a logic-module unit 78. The trip module unit includes a plurality of modules 79, each responsive to a parameter sensor. For illustrative purposes a number of the parameters sensed by the modules 79 are indicated. The trip modules 79 may be implemented with either analog or digital hardware. Each trip module 79 has an output 80 which is typcially derived from an "open collector" transistor (not shown). A trip signal delivered at the output 80 is referred to here as a partial trip. It is produced when only one sensor of a set senses an off-normal parameter. The outputs 80 deliver their respective signals to the logic-module unit 78. The logic-module unit performs the 2/4 voting function.

The logic module unit 78 has a plurality of modules 86, each cooperative with a module 79. Each module relay (coil not shown) is actuable by the signal from a corresponding output 80. Each relay has a contact 81 which is normally closed. the contacts 81 are connected to a trip bus 82 through the normally closed contact 83 of a relay 84 which is actuable responsive to intelligence of a global trip in one of the other channels II, III or IV. The global trip signal for actuating relay 84 is transmitted through a "dead-man" timer 85. This timer causes the opening of the trip breakers by means of global trip if its timing is not periodically restarted by the trip logic computer system. Each module 86 also has another relay (coil not shown). This relay is actuated responsive to intelligence of a trip in another channel CII, CIII or IV. This trip is identified as a "partial trip" in the other channel but as a "trip-enable" in channel CI. Each of the other relays has a normally-closed contact 87. Each contact 87 is connected in parallel with a contact 81. Each pair of relays whose contacts 81 and 87 are in parallel are responsive to the same off-normal parameter. The trip bus 82 is connected to ground through a resistor 88, and through the contacts 81 and/or 87 when they are all closed and the contact 83. A potential above ground, typically 5 volts, is impressed on the trip bus 82. Digitally, the effect of this potential is to impress a 1 on the trip bus 82. The trip bus is grounded either by opening both of a pair of parallel contacts 81 and 87 or by opening contact 83. Digitally, the effect of the grounding is to impress a 0 on the trip bus 82. The opening of a contact 81 of one or more pairs of parallel contacts and of a contact 87 of one or more of other pairs does not ground this trip bus 82. This is an important feature of the invention since it assures that the trip bus is not enabled for spurious off-normal response of a plurality of different sensors. A manual bypass switch SWB is associated with each module 86 of the logic-module 78. Closing of any switch SWB actuates the relays of the same module to open its contacts 81 and 87 and ground the trip bus. The same effect can be achieved by closing overall manual switch SWB1.

Figure 9:
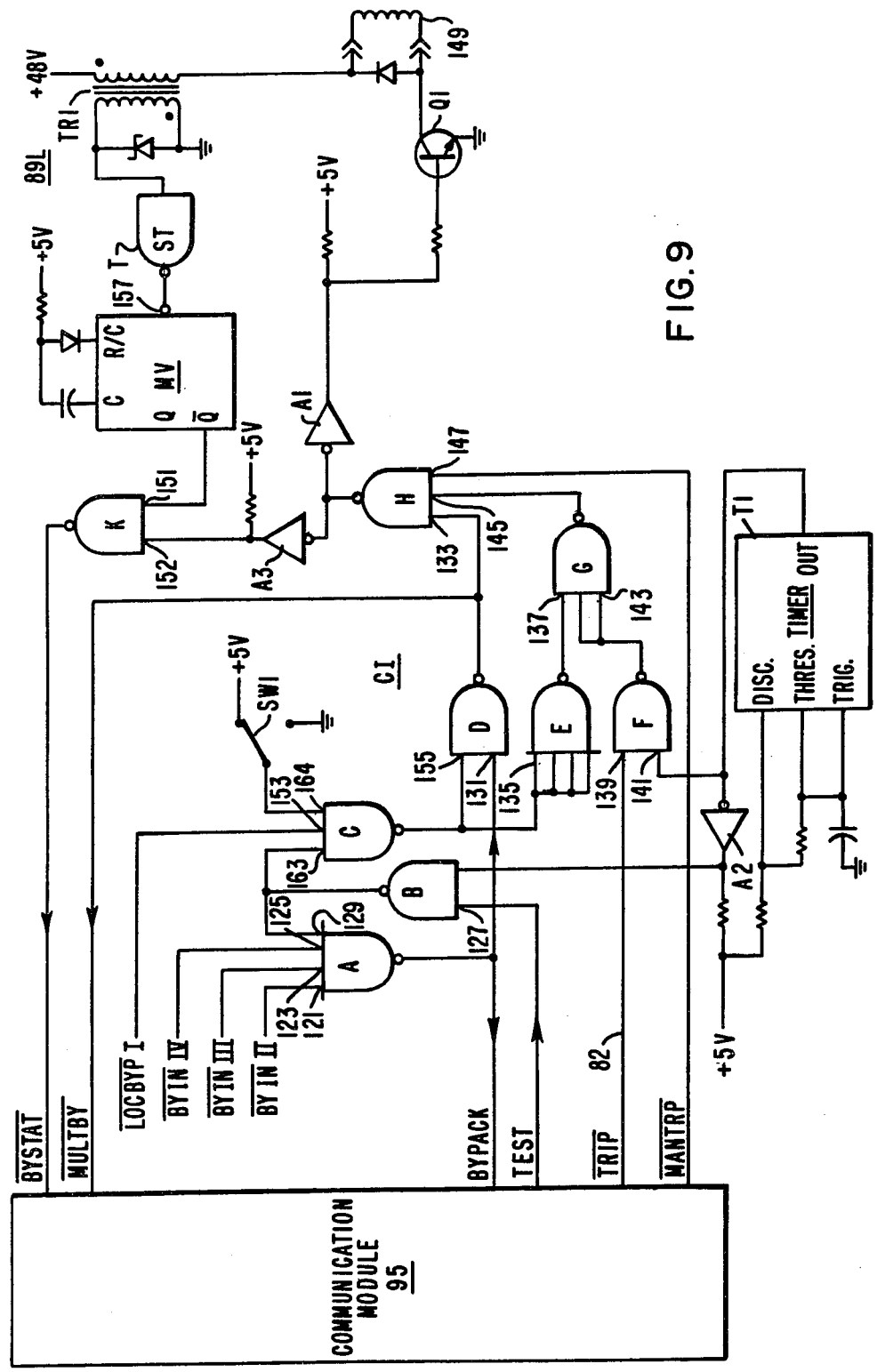
FIG. 9 is a logic schematic showing the implementation of the bypass control with solid-state apparatus.

The trip bus 82 is connected to the logic 90 of the bypass unit 89. Typically, the bypass unit 89 is a printed circuit card. The output of bypass logic 90 controls transistor Q1 (FIG. 9). The emitter-collector output of transistor Q1 is supplied through normally-closed manual switch SW13, to the undervoltage coils 149 which control the contactors 66 (FIG. 1) of the circuit breaker unit 64. With the undervoltage coils 149 deenergized the contactors 66 are opened.

The intelligence of the status of the partial-trip input and the manual bypass is transmitted from the logic module unit 78 to the trip computer system 91. This computer system 91 is a microprocesor-based computer system made up of Westinghouse ISD "Q" series printed circuit cards. This computer system receives inputs from the individual logic modules 86 and from the computers in other channels CII, CIII, CIV through isolated data links, performs what logic is necessary and provides outputs to the logic modules 86 to complete the 2/4 voting logic. In addition to the intelligence from the individual logic modules 86, "global" trip signals are provided. The only input for "global" trip is derived from the trip logic computer system 91.

The trip logic system 91 includes digital input QDI1, computer QMC1, memory QME1 associated with computer QMC1, data link transceivers QMD1 and QMD2 and digital output QDO1. The partial trip and the bypass intelligence are entered into digital input QDI1 through busses 92 and 93. This intelligence includes the data for all sensors. Bus 94 supplies test intelligence to input QDI1. Digital input QDI1 transmits this intelligence to computer QMC1 where it is processed and the result stored in memory QME1 for transmission to channels CII, CIII, CIV. This intelligence is transmitted through shared memory QMS and data-link transceiver QMD of the communication module 95. Data link transceivers QMD1 and QMD2 operate as a multiplexer to receive and sort out the intelligence from channels CII, CIII and CIV. This data is stored in memory QME1, processed by computer QMC1 and transmitted through digital output QDO1. The trip enable signal is transmitted through bus 96 and the global trip through bus 97. Computer QMC1 also processes the test signal and transmits the resulting intelligence through bus 98. The bypass unit receives intelligence of a remote bypass through bus 99 and of a local bypass through bus 100.

The intelligence as to the status of the bypass unit 89 is transmitted to channels CI, CII and CIII through the communication module 95. This module is a microprocessor based computer system including digital input QD1, computer QMC, memory QME, and the digital output OMD. The digital output QMD operates as a multiplexer to transmit the intelligence in QME and QME1 to channels CII, CIII, CIV.

The logic module unit 78 of each of the channels CI-CIV had the capability of grounding the trip bus 82. This causes the associated reactor-trip contactors 66-72 to open. The trip bus thus functions as an OR, equivalent OI in FIG. 2, with respect to the output of the logic module unit 78.

Let the partial trips of channels CI, CII, CIII, CIV be respectively A, B, C, D.

The 2/4 of the partial trips is given by the logic expression:

$$2/4\ (A,B,C,D) = A \cdot B + A \cdot C + A \cdot D + B \cdot C + B \cdot D + C \cdot D$$

A dot in this expression represents and AND operation and a plus is OR operation. The expression can be regrouped as:

$$2/4\ (A,B,C,D) = \underbrace{A}_{\text{Partial Trip}} \cdot \underbrace{(B+C+D)}_{\text{Trip Enable}} + \underbrace{(B \cdot C + B \cdot D + C \cdot D)}_{\text{Global Trip}}$$

A partial trip arises when one of the sensors of a set is off-normal. A trip enable arises when another in addition to the one is off-normal. The partial trip from the logic computer's own channel CI is set as A. It appears only once in the regrouped expression, and it is AND'ed with ⅓ of the other partial trips. This AND function is performed by the logic module, an input representing ⅓ of the other partial trips, called the "trip enable" is provided by the trip logic computer 91. The remainder of the logic expression is equivalent to ⅔ of the partial trips other than A, and is implemented using the global trip. Since only one global trip input to the trip bus is provided, all of the individual trip-function global trips are OR'ed by the trip logic computer and a single output is provided.

In the practice of this invention solid-state logic elements or logic gates may be used. In the following discussion this application refers to the inputs and outputs of these elements as 1's or 0's rather than as high or low. A 1 input or output is an input or output of 2.4 volts or higher; a 0 input or output is an input or output 0.4 volts or lower.

Figure 4:
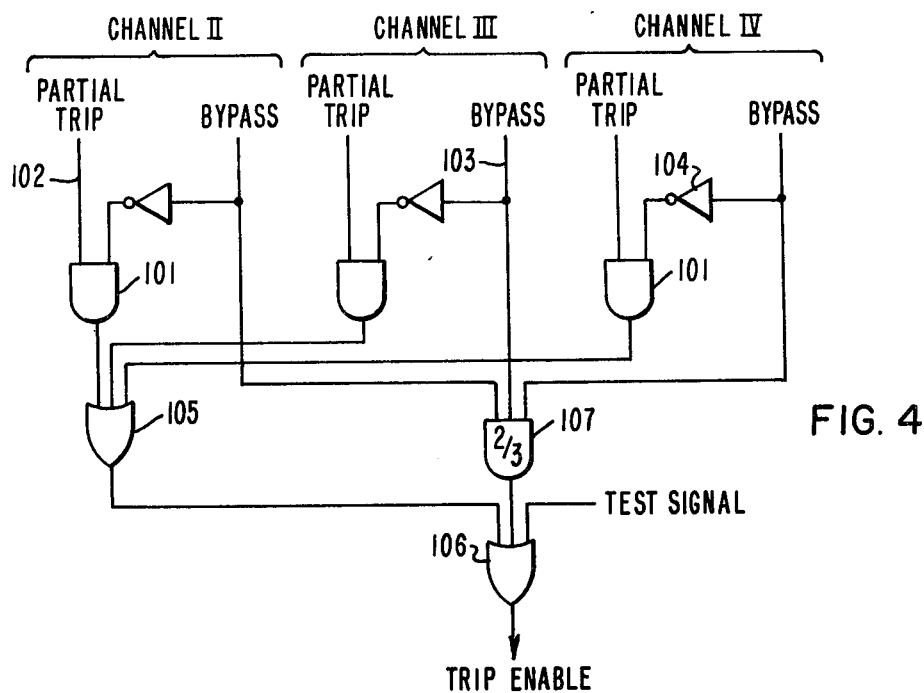
FIG. 4 is a logic schematic showing how a trip-enable function is generated.

FIG. 4 shows the logic for producing the trip enable signal which is transmitted to channel CI by combining the partial trips and the bypasses in channels CII, CIII and CIV. Each channel has an AND 101 for gating the signals. If there is a partial trip in a channel CI-CIV, a 1 is entered on its partial trip terminal 102; if there is a bypass, a 1 is entered on bypass terminal 103. The signal, 0 to 1, on terminals 103 is impressed on AND 101 through a NOT 104. In the absence of a bypass in a channel, for example, channel CII, there is a 0 on its terminal 103 and a 1 on the input to its AND 101. If there is also a partial trip in this channel CII, there is a 1 on the output of AND 101, on the output of OR 105, and on the output of OR 106 and a trip-enable signal is delivered to channel CI. A bypass in any channel CII-CIV results in a 0 on the input of the corresponding AND. The transmission of intelligence of a partial trip is blocked. The terminals 103 are connected to the inputs of ⅔ gate 107. A bypass in at least two of the channels CI-CIII produces a 1 at the output of gate 107, a 1 in the input of OR 106 and a trip enable signal to channel CI. A test signal 1 may also be impressed on OR 106 to produce a simulated test trip enable.

Figure 5:
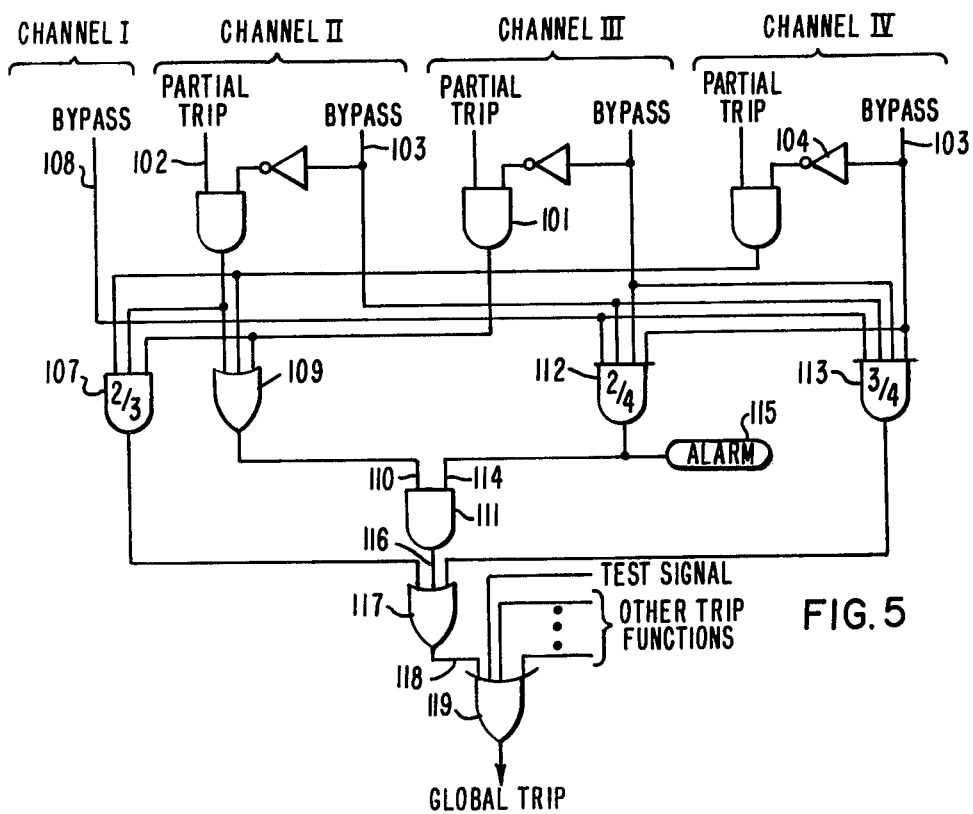
FIG. 5 is a logic schematic showing how a global trip is generated.

FIG. 5 shows the logic for producing a global trip. This view includes, in addition to the AND's 101, input terminals 102 and 103 for partial trip and bypass and NOT's 104 for channels CII-CIV and the ⅔ gate 107, the bypass terminal 108 for channel CI. In the absence of 1's for bypasses on terminals 103, a 1 on any terminal 102 signaling a partial trip, produces a 1 on the output of the corresponding AND 101 and on the corresponding input and on the output of OR 109. There is a 1 on input 110 of AND 111. The bypass terminals 103 of channels CII-CIV and bypass terminal 108 of channel CI are connected as inputs to 2/4 gate 112 and on ¾ gate 113. Bypasses in two of the channels CI-CIV produces a 1 in the output of gate 112 and a 1 on input 114 of AND 111. Alarm 115 is also enabled. With 1's on inputs 110 and 114, there is a 1 on the output of AND 111 and on input 116 of OR 117. There is a 1 on input 118 of OR 119 and a global trip is signaled. With bypasses in three out of the four channels CI-CIV, there are 1's on three of the inputs of gate 113, a 1 in its output and an input 120 or OR 117 and an input 118 of OR 119 and a global trip is signaled.

Figure 6:
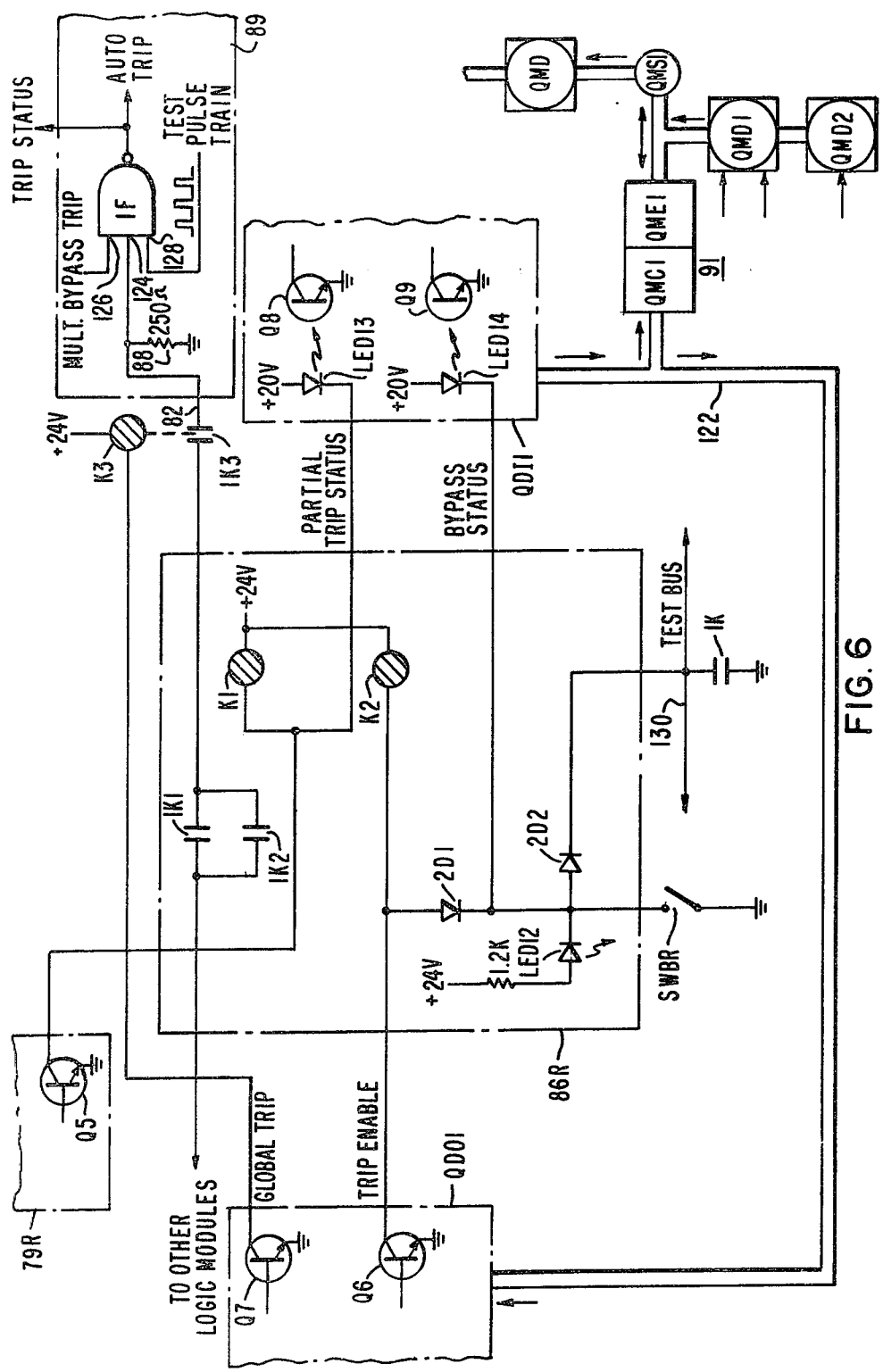
FIG. 6 is a circuit schematic of relay apparatus for implementing the logic of a reactor trip-logic channel such as is shown in FIG. 3.

FIG. 6 shows a logic module 86R (FIG. 3) in which the control components are relays. Each channel CI-CIV includes a plurality of like modules equal in number to the number of parameters monitored. It is assumed that the module 86R is a module of channel CI. Each module 86R includes a relay K1 which is responsive to partial trip generated in the associated trip module 79R. There are also relay K2, responsive to a trip enable signal, and relay K3 responsive to a global trip signal. Relays K1, K2 and K3 each has a noramlly-closed contact 1K1, 1K2, 1K3 respectively. Relay K1 is controlled from trip module 79R by transistor Q5. Q5 is conducting in the absence of a partial trip. Relay K1 is energized and contact 1K1 is closed. That realy K1 is energized manifesting the absence of an off-normal sensor is signaled by LED13 through phototransistor Q8. LED13 and transistor Q8 are in digital input QD11. The intelligence of the state of the sensor connected to trip module 79R is entered in memory QME1. Relays K2 and K3 derive their energizing current from transistors Q6 and Q7 in the digital output QD01 (FIG. 3). Digital output QD01 receives its intelligence from the other channels CII-CIV through the microprocessor 91 including multiplexer QMD1-QMD2, memory QME1, computer QMC1 and universal input-output bus 122. Digital output QD01 includes transistor Q6 which controls the energizing current for relay K2 and transistor Q7 the enegizing current for relay K3. Transistors Q6 and Q7 are conducting in the absence of trip enable or global trip. Relays K2 and K3 are energized and contacts 1K2 and 1K3 are closed. Transistors Q6 and Q7 are controlled responsive to the sensors in channels CII-CIV which sense the same parameters as is sensed by trip module 79R.

With contacts 1K1, 1K2 and 1K3 closed, there is a 1 on input 124 of NAND 1F. In the absence of a multi-bypass, there is a 1 on multi-bypass trip input 126. Pulses for test purposes are impressed on input 128. The pulses appear at the output of NAND 1F (compare with NAND F, FIG. 9) and this manifests no trip either by reason of the sensing by one sensor or more that the parameter involved is off-normal or by reason of a multi-bypass. If the local sensor senses that the parameter is off-normal transistor Q5 is rendered non-conducting, relay K1 is deenergized and contact 1K1 is opened. This is a partial trip. It has no effect on NAND 1F since contacts 1K2 and 1K3 remain closed. However, LED13 is deenergized and through transistor Q7 the intelligence of the partial trip is entered in QME1 for further processing. Now assume that the sensor sensing the same parameter is one of the channels CII-CIV also senses an off-normality. In this case, the computer system 91 transmits a trip-enable signal to QD01 rendering transistor Q6 non-conducting. Relay K2 is deenergized opening contact 1K2. Now input 124 of NAND 1F is disconnected from the +5 volts terminal and a 0 is impressed on this terminal through resistor 88. The flow of pulses through input 128 to the output of NAND 1F is blocked and there is a 1 on the output of 1F. A trip is signaled through TRIP STATUS and contactors 66 are opened.

For a global trip in channels CII-CIV, transistor Q7 is rendered non-conducting, relay K3 is deenergized, contact 1K3 is opened and a 0 is entered on input 124 of NAND 1F with the result described above.

For a manual bypass switch SWBR is closed. Relay K2 is maintained conducting through diode 2D1 and SWBR independently of the state of transistor Q7 and tripping of the breaker for channel CI is precluded. Current also flows from the +24V pole through LED12, SWBR, to ground signaling the bypass locally. LED14 is also energized through SWBR entering the intelligence of the local bypass through phototransistor Q9 in the computer.

A test bus 130 is provided. This bus is common to all logic modules 86R. Normally open contact 1K is provided for grounding test bus 130. When the test bus is grounded relay K2 is maintained energized independently of transistor Q6 through 2D1, 2D2, 130, 1K to ground. The test bus thus applies bypasses to all the logic modules. This enables computer QMC1 to verify that it can read all bypass status inputs. Diode 2D2 isolates the test bus 130 from bypass switch SWBR.

Figure 7:
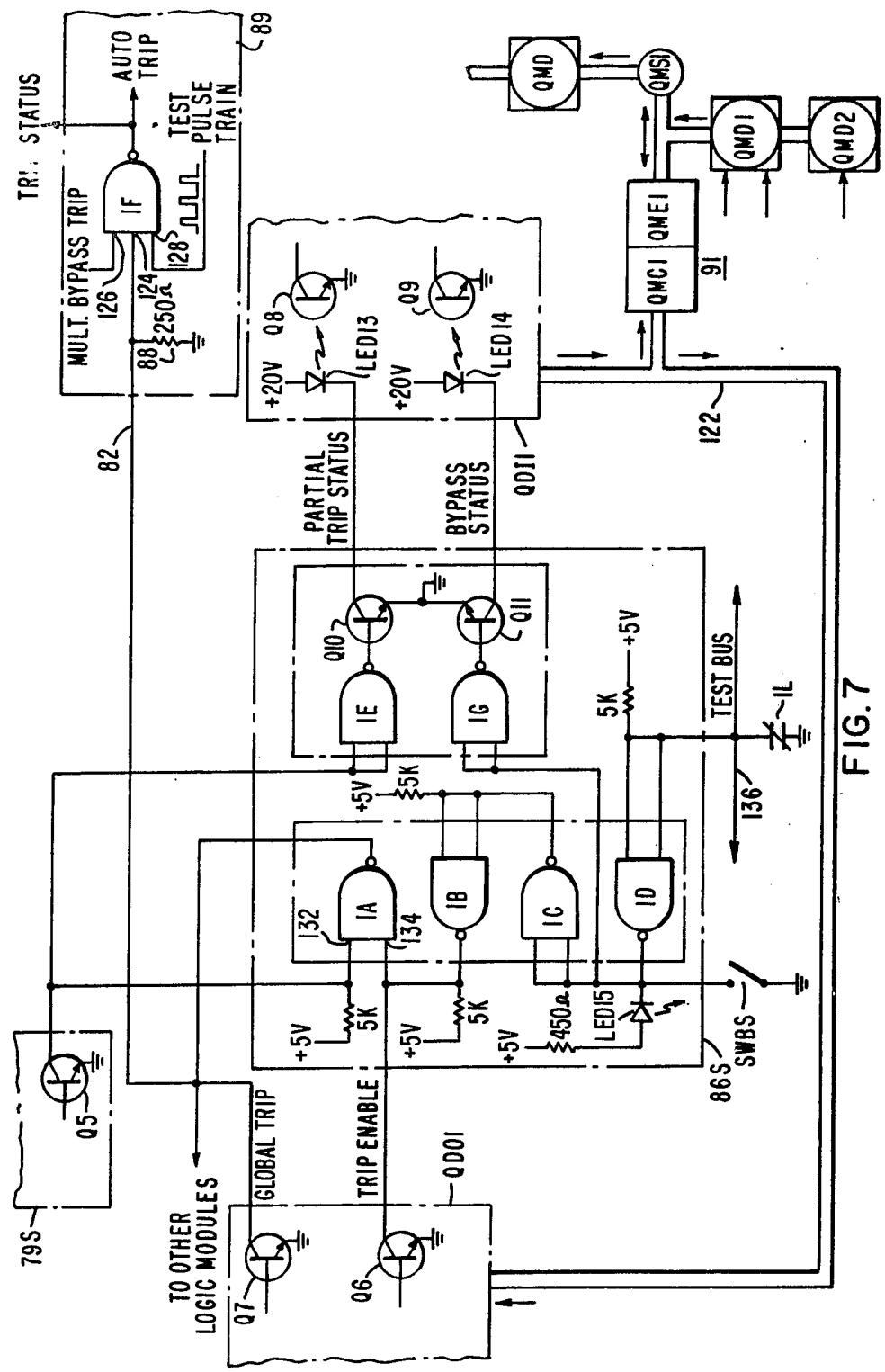
FIG. 7 is a logic schematic of solid state apparatus for implementing the logic of a reactor trip-logic channel.

FIG. 7 shows solid-state apparatus for accomplishing the same purpose as the relay apparatus shown in FIG. 6. It is assumed that this apparatus forms a part of channel CI. The solid state apparatus is implemented by transistor-transistor logic. FIG. 7 deals with the operation of a trip module 79S responsive to the sensor of one parameter and the corresponding logic module 86S. The trip module may be the same as 79R. The components outside of module 86S are the same as for the relay apparatus (FIG. 6) and operate in the same way.

With Q5 conducting there is a 0 on input 132 of NAND 1A and with Q6 conducting there is a 0 in input 134 of 1A. In either event there is a 1 on trip bus 82 and an input 124 of NAND 1F. The operation of bypass unit 89 is normal. If both Q5 and Q6 are rendered non-conducting there are 1's on inputs 132 and 134 of NAND 1A and a 0 on its output, on the trip bus and on input 124 of NAND 1F. The breaker is tripped.

Transistor Q7 is non-conducting in the absence of a global trip. There is then a 1 on trip bus 82 and on input 124 of NAND 1F. If Q7 becomes conducting there is a 0 on trip bus 82. There is a 0 on input 124 of 1F and a 1 on its output and the associated breaker is tripped.

When Q5 is conducting, there is a 0 on the inputs of NAND 1E and a 1 on its output and on the base of driver transistor Q10. Current flows through LED13 and transistor Q10. The signal in LED13 is incident on phototransistor Q8 signaling that the sensor connected 79S has not sensed an off-normal parameter. Driver Q10 is provided to isolate the logic module 86S from the higher voltage levels of digital input QDI1. When transistor Q5 becomes non-conducting, there is a 1 on the inputs of 1E and a 0 on its output. Transistor Q10 is rendered nonconducting. With LED13 deenergized, the other channels CII-CIV are signaled that the sensor of trip module 79S has sensed an off-normal parameter.

With manual bypass switch SWBS open, there is a 1 on the inputs of NAND 1C and a 0 on its output and a 1 on the output of 1B. But input 134 of 1A remains at 0 so long as Q6 conducts. There is also a 1 on the inputs of NAND 1G and a 0 on its output and on driver transistor Q11. LED14 is non-conducting and QDI1 transmits through Q9 the intelligence that there is no manual bypass in 86S. Transistor Q11 performs the same isolating function as Q10.

With switch SWBS closed, there is a 0 on the inputs of NAND 1C, a 1 on its output, and a 0 on the output of 1B. Transistor Q6 is bypassed. There is also a 0 on the inputs of NAND 1G and a 1 on its output. Transistor Q11 is conducting and LED14 through phototransistor Q9 signals the bypass. Also LED15 is energized giving a local indication of the bypass.

The test bus 136 is isolated from the switch SWBS by NAND 10. Normally test bus 136 is grounded through contact 1L. There is a 0 on the inputs of NAND 1D, a 1 on its output and on the input of NAND 1G. There is a 0 on the output of 1G and transistor Q11 and LED14 do not conduct. When a test is called for contact 1L is opened. There is a 1 on the inputs of 1D; a 0 on its output and on the inputs of 1G. There is a 1 on the output of 1G. Transistor Q11 and LED14 conduct signaling the test. The 0 on the output of NAND 1D permits LED15 to conduct giving a local indication of the test.

Because the trip logic apparatus is a portion of the overall power-supply apparatus, it must be periodically tested to verify that it is operational. By cycling through the combinations of partial trip, trip enable and global trip inputs and verifying the proper trip action. Test signal inputs are provided on the trip enables and the global trip busses for this purpose (refer to OR's 106 and 119 of FIGS. 4 and 5).

Test busses 130 (FIG. 6) and 136 (FIG. 7) are connected to all logic modules 86R and 86S, respectively. Control of these busses allows the verification of the capability of the trip logic computer system 91 to read the bypass statuses.

Their capability to read the partial trips can be verified during the functional test of the trip modules in which the partial trip outputs changing state. The logic internal to the trip logic computer system is tested by substituting simulated data link inputs to the computer and cycling through all practicable logic combinations.

Figure 8:
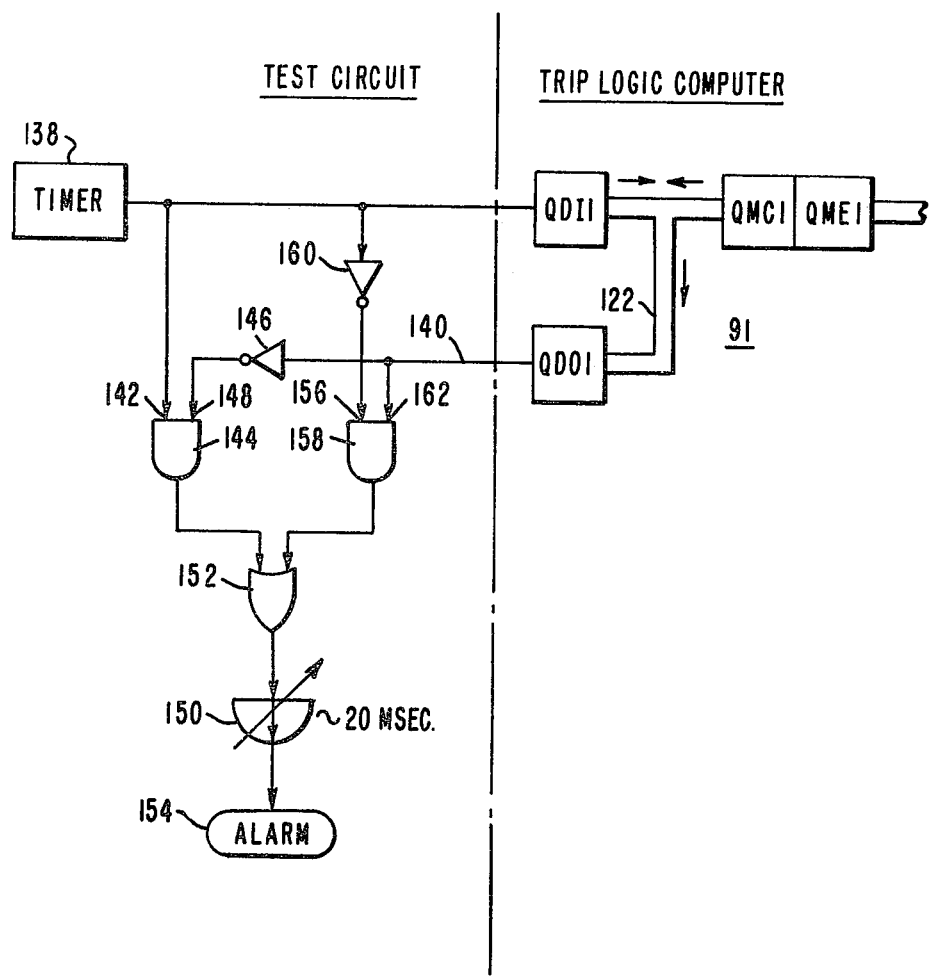
FIG. 8 is a logic schematic illustrative of apparatus for the continuous testing of the reactor triplogic computer.

All of the tests described above are periodic in nature and are conduucted by the automatic test system. In addition to these tests, certain continuous testing of the trip logic apparatus is provided to detect malfunctions as soon as they occur and actuate an alarm. This permits prompt maintenance of the apparatus, thus improving its reiability. These tests include the usual parity checks, check sums, etc. which are normally included with data links and digital processing, but they also include some hardware test features. FIG. 8 shows a test circuit which continuously verifies the trip logic computer's operablility.

Timer 138, which is essentially a pulse generator, enters alternate 1 and 0 signals. In digital input QDI1 of the trip-logic computer system 91. The computer system 91 must read these signals and deliver an identical signal at its output. Assume that a 0 was first transmitted by timer 138 and there is a 0 on output bus 140. When a 1 is first transmitted, there is a 1 on input 142 of AND 144. Through NOT 146 there is also a 1 on input 148. AND 144 produces a 1 at its output starting timer 150 through OR 152. Also, there is a 0 on input 156 of AND 158 through NOT 160. AND 158 produces 0 output. If there is no 1 on bus 140 within 20 milliseconds, typically, timer 150 times out sounding alarm 154.

If there is a 1 output on bus 140, before timer 150 times out, there is a 1 on input 162 of AND 158 but as there is a 0 on input 156 there is a 0 on the output of AND 158. With a 1 on bus 140, there is a 0 on input 148 of AND 144 through NOT 146 and a 0 at output of AND 144 and a 0 on timer 150 through OR 152 and timer 150 stops timing and resets. When timer 138 next transmits a 0 there is now a 1 on bus 140 and on input 162. There is also a 1 on input 156 through NOT 160. There is a 1 on the output of AND 158 and through OR 152 timer 150 starts to time again. The entry of a 0 on bus 140 within 20 ms produces a 0 at the output of AND 158 and stops and resets timer 150. IF no 0 is entered the alarm 154 is actuated. The 1 and 0 pulses delivered by timer 138 must be at least as long as the timing interval of timer 150; i.e., typcially 20 ms.

In addition to being able to perform the 2/4 voting logic at the trip-function level, the trip logic apparatus as described can alternatively perform the logic of a general protection system with function level bypasses. In a general protection system, any single partial trip in a channel opens the trip breakers of that channel without the need for corroboration from another channel. If two channels trip for any reason, the reactor is tripped. The main drawback to this type of protection system is that it tends toward lower plant availability due to spurious trips. The trip logic apparatus according to this invention performs this type of logic if the trip logic computer software is altered to cause the trip-enable outputs to be normally in the "enable" state (output transistor Q6 off); for instance, if a failure is sensed. The partial trip input can open the breakers directly. The global trip logic remains the same as described above, with the individual bypass status signals being the logic sum (OR) of the trip-function bypass status and the trip-breaker bypass status for each channel set.

FIG. 9 shows solid-state logic 89L for implementing the bypass unit 89 of FIG. 3 (see also FIGS. 6 and 7). This is the logic for one channel, assumed to be CI. In this case, only the bypass signals are shown to be interlocked. The trip signals are supplied separately through the trip bus described above.

$\overline{BYIN}$ II, $\overline{BYIN}$ III, and $\overline{BYIN}$ IV are mnemonics identifying signals on the fiber optics conducting intelligence to CI from the other three channels CII, CIII, CIV. $\overline{LOCBYP}$ identifies a hard wire logic signal which conducts the automatic local bypass intelligence for channel CI.

A line over a mnemonic signifies low (0) true logic; i.e., that a 0 is impressed in the conductor when the signal identified by the mnemonic is present. The absence of a line signifies high (1) true logic; i.e., that a 1 is impressed on the conductor when the signal identified is present. The 1's and 0's may be pulses or levels. For example, when a sensor in channel C II is bypassed, a 0 level is impressed on $\overline{BYIN}$ II; when a test is to be carried out a 1 level is impressed on TEST. The mnemonic $\overline{MULTBYP}$, multi-bypass identifies the state of multi-bypass intelligence in channel CI. When a 0 is impressed on $\overline{MULTBYP}$, channel CI has received intelligence of a local and of a remote bypass; i.e., there is a 0 $\overline{LOCBYP}$ I and at least on one of $\overline{BYIN}$ II, III or IV. The mnomonic $\overline{BYSTAT}$, bypass status, identifies the status of local bypass intelligence as to its channel. A 0 on $\overline{BYSTAT}$ signifies that there is only a local bypass in channel CI. The terminal $\overline{BYIN}$ I in channels CII, CIII or CIV, which recieve the LOCBYP I signal of channel CI as remote signals, have impressed on them the same signal as is entered on $\overline{BYSTAT}$.

$\overline{BYIN}$ II, III and IV signals are derived from the resective remote channels CII, CIII and CIV through the computer. $\overline{LOCBYP}$ I, as well as $\overline{LOCBYP}$ II, III or IV, are derived from their own channels. $\overline{MULTBYP}$ is entered in the computer of the apparatus. The $\overline{BYSTAT}$ signal is also entered in the computer; the computer impresses this signal on the corresponding remote $\overline{BYIN}$ inputs. The $\overline{BYPACK}$, bypass acknowledge, signal is entered in the computer and the TEST signal is derived from the computer. The $\overline{TRIP}$ signal is entered in the channel.

The $\overline{MANTRP}$ signal is entered by the operator in the console (not shown) of the apparatus. The $\overline{MANTRP}$ signal trips the breaker controlled by the channel even if there is a local bypass 0 in LOCBYP. A local bypass may be entered manually by closing switch SW1.

In the absence of any bypass or test, there are 1's on $\overline{BYIN}$'s II, III, IV and in the corresponding inputs 121, 123 and 125 of NAND A. There is a 0 on input 127 of NAND B and 1 on its output and on input 129 of NAND A. There is a 0 on the output of A. BYPACK has a 0. The computer system 95 (FIG. 3) cooperative with the apparatus is informed that channel C1 has no intelligence of partial bypasses in channels CII, CIII or CIV. There is also a 0 on input 131 of NAND D and a 1 on its output and on input 133 of NAND H. There are also 1's on the inputs 153, 163, 164 of NAND C and 0's on inputs 135 of NAND E. There is a 1 on the output of NAND E and on input 137 of NAND G. In the absence of $\overline{TRIP}$, there is a 1 on input 139 of NAND F (FIGS. 6, 7). Timer T1 typcially delivers a 1 level pedestal interrupted continuously by ten 5 millisecond 0 pulses per second. Timer T1 is essentially a pulse generator. Between the 0 pulses generated by timer T1, there is a 1 on input 141 of NAND F and a 0 on its output. There is a 0 on input 143 of NAND G and a 1 on its output and on input 145 of NAND H. In the absence of $\overline{MAN}$ $\overline{TRP}$, manual trip, there is a 1 on input 47 of NAND H and a 0 on its output. There is a 0 on the input of amplifier A1 and a 1 on its output. Transistor Q1 is conducting and energizing undervoltage coils 149. this prevents the breaker, which coils 149 control, having contactors 66, FIG. 1 from tripping.

Each 5 ms pulse of timer T1 impresses a 0 on input 41 of NAND F. A 1 pulse appears at the output of NAND F and a 0 pulse is impressed on input 145 of NAND H and a 1 on its output. The output of A1 goes to 0 during the 5 ms interval and during these intervals transistor Q1 is non-conducting. This non-conducting interval is too short to deenergize coils 149 and the breaker is prevented from tripping. The pulses are transmitted through pulse transformer TR1 and through Schmitt trigger ST enabling retriggerable, one-shot, multivibrator MV. $\overline{Q}$ output of MV goes to 0. Typically, the timing period of MV is about 110 ms. The operation of the multivibrator MV is such that its 0 output at $\overline{Q}$ overlaps the intervals between the 5 ms pulses so that $\overline{Q}$ remains at 0 level if, and so long as, 5 ms pulses are impressed. A 0 level is impressed on input 151 of NAND K and a 1 on its output. ON $\overline{BYSTAT}$, the 1 indicates that there are no local bypasses in channel CI. A 1 is entered on $\overline{BYIN}$ I in the other channels CII, CIII, CIV.

In the event of a local bypass, there is a 0 level on $\overline{LOCBYP}$ and on input 153 of NAND C. There is a 1 level on the output of NAND C and on input 155 of NAND D and inputs 135 of NAND E. NAND D is not affected but the output of NAND E is 0 level and there is a 0 level in input 137 of NAND G and a 1 level on its output and on input 145 of NAND H. There is a 0 level on the output of NAND H and on the input of amplifier A1 and a 1 on its output. Transistor Q1 conducts and the breaker is prevented from tripping as should happen for a partial bypass.

NAND G operates as a gate. $\overline{TRIP}$ signals entered on input 139 of NAND F would produce a 1 on its output and on input 143 of NAND G. The 0 on input 137 prevents these $\overline{TRIP}$ signals from passing and producing a trip. It also prevents the 5 ms pulses from timer T1 from passing through this NAND. There are no pulses on input 157 of multivibrator MV and there is a 1 level on its output $\overline{Q}$ and on input 151 of NAND K. In the absence of the 5 ms pulses, there is a 0 on the input of inverter A3 and 1 on its output and an input 152 of NAND K. There is a 0 level on the output of K and on $\overline{\text{BYSTAT}}$ signaling a local bypass. The 0 is entered on the corresponding $\overline{\text{BYIN}}$ I conductors in channels CII, CIII, CIV. A 1 is entered on the output of NAND A and on output terminal BYPACK. The entry of the bypass in $\overline{\text{BYRIN}}$ I in channels CII-CIV is acknowledged.

Now assume that there is no local bypass but that there is a remote bypass in one of the other channels CII, CIII or CIV. There is a 0 on $\overline{\text{BYIN}}$ II, III or IV and on one of the inputs 121, 123, or 125 of NAND A. There is a 1 on its output and on BYPACK entering and acknowlegement of the bypass in the computer 95. There is a 1 on input 131 of NAND D but this has no effect since there is a 0 on its input 155. The operation of channel CI as described above will continue unaffected by the local bypass in the other channel in the absence of a local bypass in CI.

Now assume that in addition to the local bypass in one of the channels CII, CIII or CIV, there is a local bypass in channel CI. There are then 1 level on inputs 131 and 155 of NAND D and a 0 level on its output. There is a 0 on $\overline{\text{MULTBY}}$, and the computer 95 is informed of the multi-bypass and an alarm is enabled. There is a 0 level on input 133 of NAND H, a 1 on its output and on the input of amplifier A1. There is a 0 level on the output of A1 and on the bases of Q1. Q1 is rendered non-conducting and contactors 66 (FIG. 1) are opened. The pulses from T1 are blocked and there is a 1 level on output $\overline{\text{Q}}$ of multivibrator MV. However, because of the 1 on the outpt of NAND H, there is a 1 on inverter A3 and a 0 on its output and on input 152 of NAND K. There is a 1 on $\overline{\text{BYSTAT}}$ and on the $\overline{\text{BYIN}}$ I's of channels CII, CIII and CIV.

It is to be noted that with a local and a remote bypass entered in channel CI, 0's for remote bypasses would, in the absence of the 1 on $\overline{\text{BYSTAT}}$ in channel C1, be entered at $\overline{\text{BYIN}}$ I of the other channels CII, CIII, CIV. In addition, one of these other channels, say CII, would also enter a 0 for a local bypass corresponding to the remote bypass in channel CI. This would produce a trip of the breaker in this other channel, CII, and trip the reactor. The entry of the 1 from $\overline{\text{BYSTAT}}$ of CI on $\overline{\text{BYIN}}$ I of CII prevents this trip.

With no bypasses, the apparatus is in a 2/4 trip configuration. Now let it be assumed that a 0 is entered on $\overline{\text{LOCBYP}}$ of CI and that there are no other bypasses. Under such circumstances, the entry of $\overline{\text{TRIP}}$ for CI, but not for CII, CIII or CIV, is blocked. Trips entered in two of the latter three channels, trips the reactor. In other words, the apparatus is in a ⅔ trip configuration. The status of the logic is: a 0 On $\overline{\text{LOCBYP}}$ of CI, and 0's on $\overline{\text{BYIN}}$ I of CII, CIII and CIV.

Let is now be assumed that a 0 is entered on $\overline{\text{LOCBYP}}$ of channel CII. CII now has 0's on $\overline{\text{BYIN}}$ I and on $\overline{\text{LOCBYP}}$ and there is trip of the breaker in CII and a partial trip of the reactor. $\overline{\text{BYSTAT}}$ of CII enters a 1 on $\overline{\text{BYIN}}$ II of CI. There is no trip of the breaker of CI. The entry of the 0 on $\overline{\text{LOCBYP}}$ of channel CI continues to block $\overline{\text{TRIP}}$ in channel CI. There remain two channels, CIII and CIV, in any one of which $\overline{\text{TRIP}}$ may be entered to trip the reactor. The apparatus is on a ½ configuration. The status of the logic now is: 0 on $\overline{\text{LOCBYP}}$ and 1 on $\overline{\text{BYIN}}$ II of MCI; 0's on LOCBYP and $\overline{\text{BYIN}}$ I of channel II; 1's on $\overline{\text{BYIN}}$ II of CIII and CIV and 0's on BYIN I of CIII and CIV.

Finally, let it be assumed that a 0 is entered on $\overline{\text{LOCBYP}}$ of CIII. With 0's on $\overline{\text{BYIN}}$ I and on $\overline{\text{LOCBYP}}$ of channel CIII, the breaker for CIII is tripped. With the breakers in CII and CIII tripped the reactor is tripped. Only channel IV in which a $\overline{\text{TRIP}}$ may be entered remains. The configuration is 0/1.

Of interest is the distinction between a partial trip of the reactor 11 (FIG. 1) by reason of a local and a remote bypass in a channel and a trip resulting from two off-normal unbypassed sensors. Two partial trips resulting from sets of bypasses of like sensors are required to trip the reactor 11. Only one trip by reason of the sensing of an off-normal by two unbypassed sensors is required to trip the reactor (see FIG. 2).

The TEST input terminal operates to test the integrity of NANDS C, D and H and K, inverter A1, transistor Q1, transformer TR1, Schmitt trigger T, and multivibrator MV. The test is carried out with a simulated bypass 0 level on $\overline{\text{LOCBYP}}$ and a 1 level on TEST. There is a 0 on input 153 of NAND C. Assume that there are no remote bypasses so that there are 1's on BYiN I, II and III and in inputs 121, 123, 125. The 1 on TEST permits the 5 ms pulses to pass through NAND B but because of the 0 on input 153, the pulses cannot pass through NAND C. But the pulses are impressed on input 129 of NAND A and with 1's on inputs 121, 123, 125 of this NAND, pulses are impressed on input 131 of NAND D. There is a 1 at the output of NAND C and on input 155 of NAND D. The pulses pass through NAND D, NAND H, and through transistor Q1, transformer TR1, and multivibrator MV producing a 0 on input 151 and a 1 on the output of NAND K and on $\overline{\text{BYSTAT}}$ indicating no real bypass notwithstanding the simulted test 0 on $\overline{\text{LOCBYP}}$.

If there is no simulated 0 on $\overline{\text{LOCBYP}}$ but an artificial 0 on one or more of $\overline{\text{BYIN}}$ I, II or III, the pulses pass through input 163 of NAND C and again indicate no local bypass.

For local manual bypass, switch SW1 is grounded impressing a 0 level on input 164 of NAND C and 1 on its output. Transistor Q1 continues to conduct in the same manner as for a 0 on $\overline{\text{LOCBYP}}$. Also, the transmission of $\overline{\text{TRIP}}$ is prevented in the same manner as for a local bypass, by 0 on input 137 of NAND G. Also, there is a 0 on $\overline{\text{BYSTAT}}$ indicating a bypass.

When two sensors detect an off-normal operation, a 0 is entered on $\overline{\text{TRIP}}$. There is a 0 on input 139 of NAND F and the passage of pulses from timer T1 is blocked. There is a 1 on the output of F and on input 143 of NAND G. If there is at this time no local bypass, input 137 of NAND G is also 1 and its output is 0. There is a 0 on input 145 of NAND H and a 1 on its output and the input of inverter A1. There is a 0 on its output and Q1 is non-conducting and the breaker is tripped.

Through inverted A3 there is a 0 on input 152 NAND K and a 1 on its output. A signal from $\overline{\text{BYSTAT}}$ indicating a local bypass is precluded.

In the event that there is a local bypass, there is a 0 on input 137 of NAND G. The passage of $\overline{\text{TRIP}}$ is prevented. This feature is necessary to prevent a trip if the local sensor is out for maintenace or testing or is defective. A test bypass signal may be impressed on LOCBY to verity that the system is operating properly.

Figure 10:
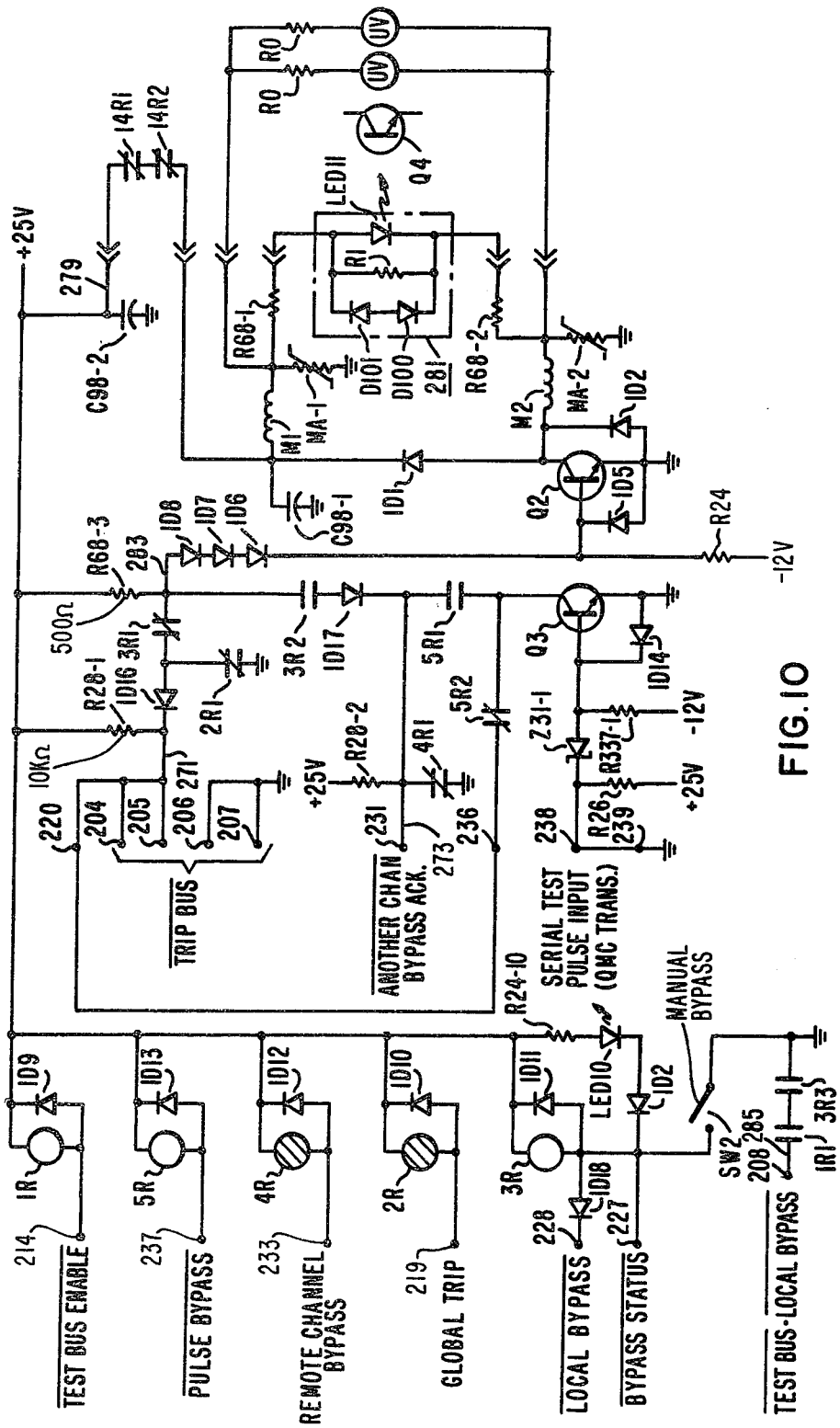
FIG. 10 is a circuit schematic showing the implementation of the bypass control with relay apparatus.

FIG. 10 shows relay apparatus for performing the same operations as are performed by the solid-state apparatus shown in FIG. 9. The operation is carried out by relays 1R through 5R whose coils are connected between the +25V pole of the supply and terminals 214, 219, 228, 233 and 237, respectively. To energize one of the relays, the corresponding terminal is grounded. The functions of relays 1R through 5R are as indicated in FIG. 10. Diodes 1D9 through 1D13 across the relay coils suppress voltage transients across the coils and oscillations through their coils when they are turned on or off. Damage to the controlling transistor and chattering is thus suppressed. Relays 2R and 4R, whose coils are shown cross-hatched, are energized during normal operation of the apparatus. Contacts 2R1 and 4R1 are open. The ground connection through 2R1 of the trip bus 271 is open. The ground connection for the remote bypass acknowledge bus 273 is also open. The collector of transistor Q3 is normally connected to the trip bus 271 through terminals 236 and 220 and back contact 5R2.

The trip bus 271 may also be grounded by connecting its terminals 204 to ground terminal 206 or 205 to ground terminal 207. This double connection is a redundancy for the purpose of achieving reliability. This connection is controlled by the apparatus shown in FIG. 11.

Figure 11:
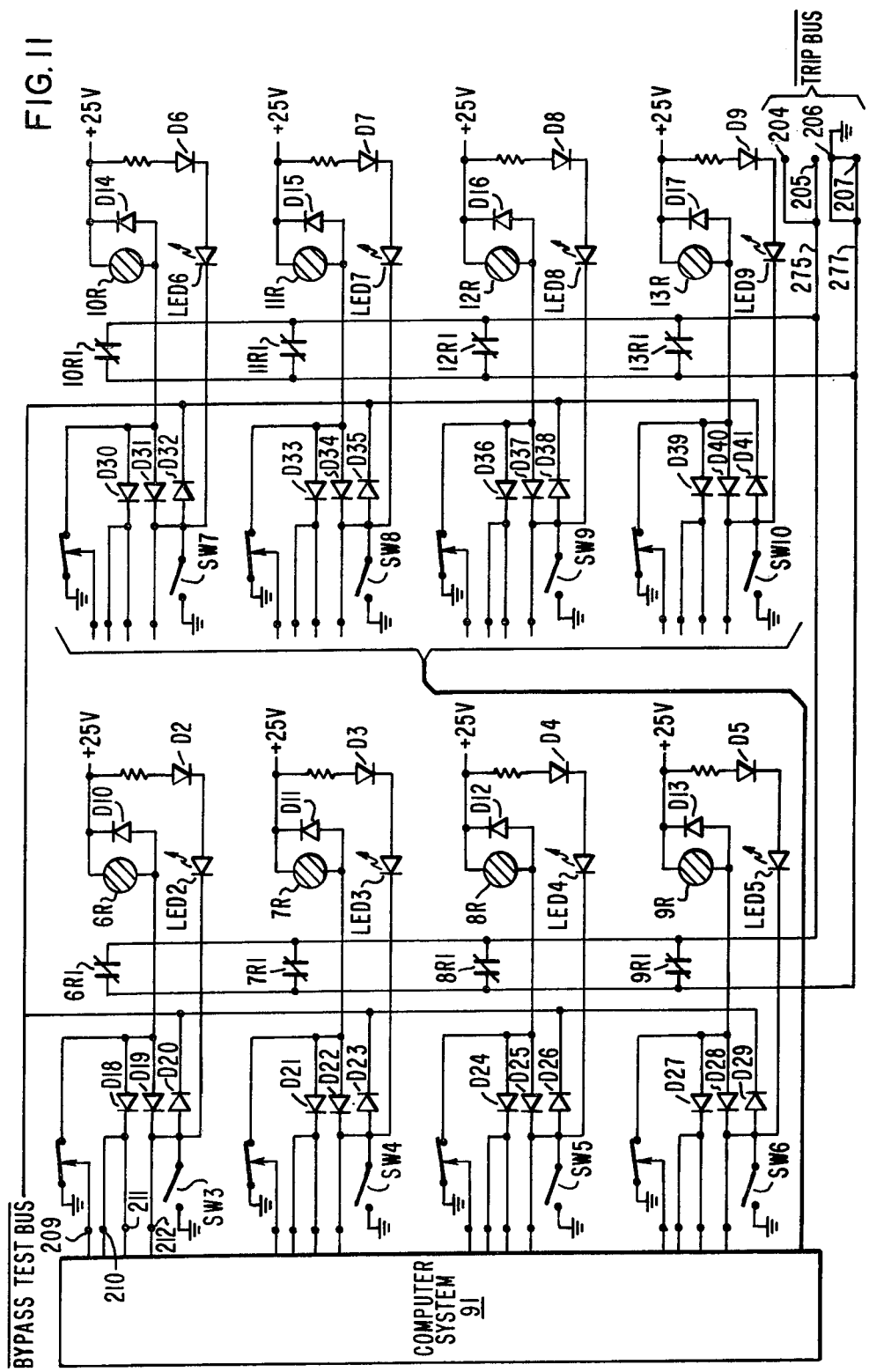
FIG. 11 is a circuit schematic of the trip logic for the breakers of the apparatus implemented by relays which is cooperative with the relay control shown in FIG. 10.

FIG. 11 shows the control of one channel, say CI, responsive to eight of the sensors which sense eight different process parameters. This serves as an alternatvie to the apparatus shown in FIG. 6. Typically 18 process parameters are sensed and there is in this one channel additional like control for the other sensors. Relays 6R through 13R, respectively, each responds to a different sensor. The diodes D10 through D17 across the relays serve to suppress oscillation. Normally, relays 6R through 13R are energized. The circuits for these relays are alike; only the circuit for 6R need be considered in detail. The coil for 6R is energized in a circuit extending from the +25V pole of the supply, through the coil to terminal 209 which is grounded and through diode D18 to terminal 210 which is also grounded. Since all the relays 6R through 13R are energized, all contacts 6R1 through 13R1 are open. Bus 277 which is connected to grounded terminals 206 and 207 is disconnected from 275 which is connected to terminals 204 and 205 and trip bus 271.

During normal operation in the absence of bypasses or off-normal sensor detections, trip bus 271 (FIG. 10) is not grounded. The base and emitter of transistor Q2 are connected in a circuit extending from the +25V pole of the power supply through resistor R68-3, diodes 1D8, 1D7, 1D6, the bases and emitter of Q2 to ground. There is also a circuit from ground through diode 1D5, resistor R24 to the −12V pole of the power supply. The voltages in these circuits are so related that there is +0.7 volts on the base of Q2 and it conducts in a circuit extending from the +25V pole, through remote trip switches 14R1 and 14R2 of the breaker, choke M1, resistors RO, trip coils UV of the breaker, the choke M2, the collector and emitter of Q2 to ground. The trip coils UV are energized and the breaker is closed. Thyrisotrs MA1 and MA2 are connected between chokes M1 and M2 and ground. The chokes and thyristors suppress radio frequency disturbances such as result from spikes.

The serial test is performed by impressing between terminals 238 and 239 successive trains of pulses, typically 3 pulses each of 0.6 ms duration. The pulses may be impressed typically 3 times per second. The pulse trains are impressed between the base and the emitter of transistor Q3. Normally, this transistor is maintained non-conducting by current flow from ground through diode 1D14, resistor R337-1 to the −12V pole of the supply. The pulse trains are impressed between the base and emitter of Q3, through zener diode Z31-1 which breaks down when the pulses are impressed. The pulses render transistor Q3 conducting.

With Q3 conducting pulse trains flow from the +25V pole through resistor R28-1, conductor 271, terminal 220, terminal 336, normally-closed contact 5R2 of relay 5R, the collector and emitter of Q3, ground, diode 1D5, resistor R24 to the −12V pole of the supply. Each pulse of a train renders transistor Q2 non-conducting but for so short an interval that the undervoltage relays UV remain energized. The trains of interruptions occur in a circuit extending from the +25V pole through conductor 279, remote-trip switches 14R1 and 14R2, choke M1, resistor R68-1, pulse train receiver 281, resistor R68-2, choke M2, the collector and emitter of transistor Q2 to ground. The pulse trains are not materially affected by the chokes M1 and M2 and tyristors MA1 and MA2.

Receiver 281 includes diodes D100 and D101 shunted by resistor R1 and also by LED11. During the serial test, LED11 produces trains of light pulses which are incident on phototransistor Q4. Transistor Q4 converts the trains of light pulses into trains of electrical pulses which are transmitted as intelligence to the computer associated with the channel.

For a local bypass, relay 3R is energized. Current also flows from the +25V pole, through LED10 diode 1D2, diode 1D18, terminal 228 to ground. LED10 is energized signalling the local bypass. Current also flows through terminal 227 informing the computer system 95 of the local bypass. Analogous operation occurs for a manual bypass produced by switch SW2.

With relay 3R energized normally-closed contact 3R1 is opened and normally-open contacts 3R2 and 3R3 are closed. At contact 3R1 resistor R68-3 is disconnected from the trip bus 271. However, transistor Q2 is supplied with control current from +25V pole to maintain it conducting, as before the bypass, from the +25V pole through resistor R68-3, and diodes 1D6, 1D7, 1D8. If there is no local bypass of a like sensor in another channel, there is no remote channel bypass, and relay 4R remains energized and 4R1 remains open. Transistor Q2 continues to conduct and coils UV remain energized and prevent tripping of the breaker.

To test the integrity of relay 3R, relay 5R is energized opening contact 5R2 and closing contact 5R1. At 5R2, transistor Q3 is disconnected from terminals 236 and 220. At contact 5R1 transistor Q3 is connected to continue to impress the trains of pulses in the control circuit of transistor Q2. If receiver 281 detects the series-test pulse trains the integrity of relay 3R is verified.

On the occurrence of a remote bypass, relay 4R is deenergized and contact 4R1 is reclosed. Terminal 231 is grounded and the remote bypass is acknowledged. If there is at this time also a local bypass, relay 3R is energized, grounding conductor 283 and rendering transistor Q2 non-conducting, tripping the breaker. If there is a local bypass in one channel, say channel CI, remote bypass relays 4R in the other channels CII-CIV are deenergized. Now if there is a local bypass, say, in channel II, intelligence of this local bypass is entered in the computer system memory QME1 and the entry of a remote bypass indication in channel CI is blocked.

In the event of a global trip relay 2R is deenergized reclosing contact 2R1 and grounding conductor 283. Transistor Q2 is rendered non-conducting. If a local bypass occurs in, say, channel CI before a global trip, in another channel, relay 3R is actuated opening contact 3R1 and preventing transistor Q2 from becoming non-conducting; i.e., preventing the entry.

Test bus 285 is enabled by energizing relays 1R and 3R. Contacts 1R1 and 3R3 are closed grounding terminal 208 and entering remote bypasses in the other channels.

The operation of trip bus 271 is controlled by normally-energized relays 6R through 13R (FIG. 11). Only the operation of relay 6R need be considered. Terminals 209 and 210 are grounded. On the occurrence of a partial trip, i.e., the detection of an off-normal parameter by one sensor, terminal 210 is ungrounded and the computer receives intelligence of the partial trip through terminal 211. If the computer memory carries intelligence of another partial trip for a sensor for the same parameter, a trip-enable signal is impressed and terminal 209 ia ungrounded and relay 6R is deenergized reclosing contact 6R1. Conductor 277 is grounded by connection to conductor 275 and the trip conductor 271 is grounded deenergizing transistor Q2. The breaker is tripped. It is to be noted that since resistor R68-3 is 500 ohms while R28-1 is 10K, diode 1D16 is conducting.

Switch SW3 through SW10 can override this operation for the corresponding sensor. These switches when closed ground the corresponding relay 6R through 13R permanently opening the corresponding contact. The closing of any switch SW3 through SW10 is signalled by corresponding LED2 through LED9. Also in the event of a bypass of the sensor controlling relay R6 terminal 212 is grounded overriding the trip through terminals 209 and 210.

Figure 12:
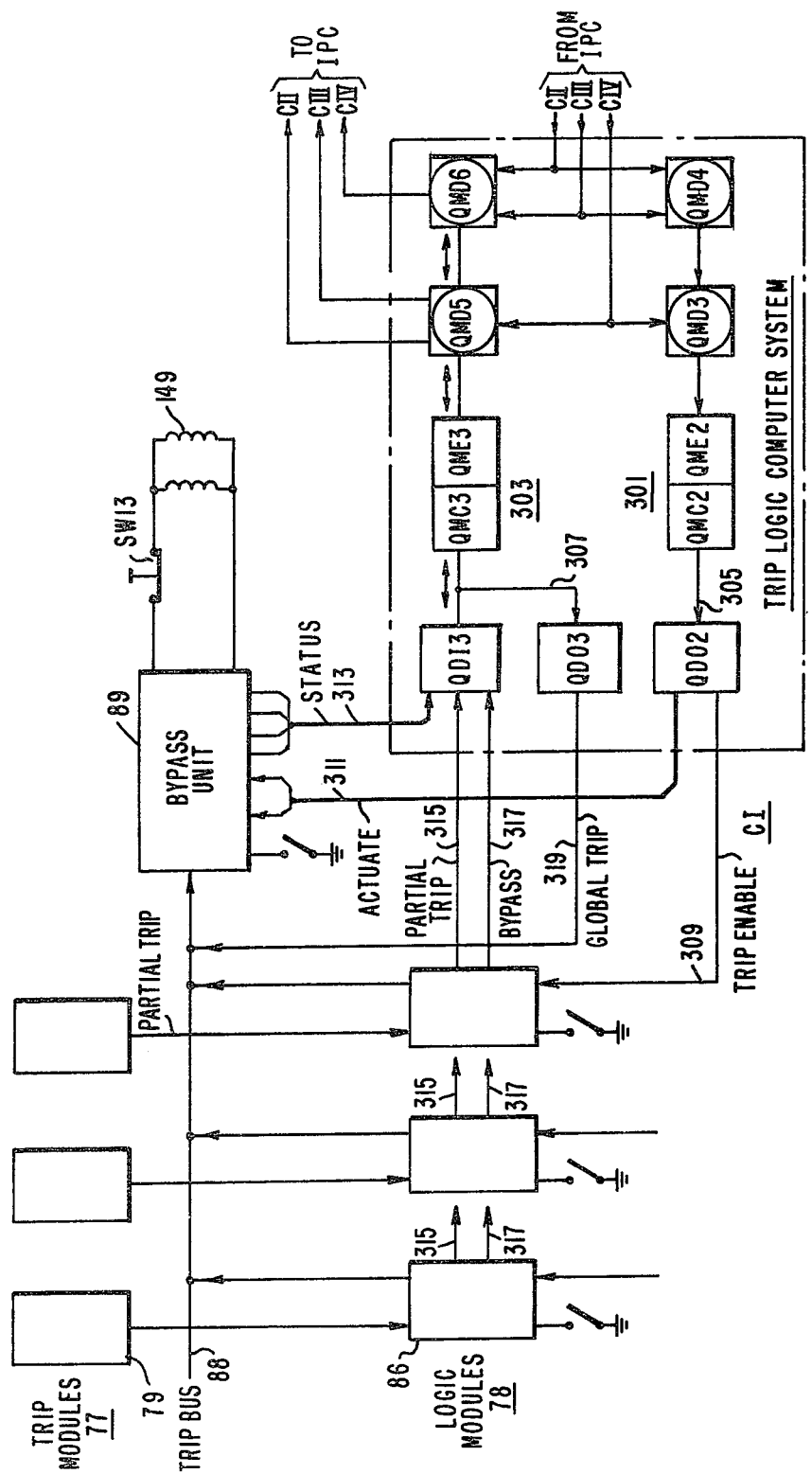
FIG. 12 is a block diagram showing the important feature of a reactor trip-logic channel which is capable of meeting the conventional low probability of computer failure for nuclear power supply apparatus.

FIG. 12 shows apparatus in which two microprocessor-based trip-logic computer systems 301 and 303 are interconnected with the logic modules 86 and the bypass unit 89 in each channel.

The microprocessor 301 includes the data link transceivers QMD3 and QMD4 which serve as a multiplexer to transmit the data received from the remote channels CII, CIII and CIV assuming that the intelligence is being received by channel CI. The microprocessor 301 also includes the computer QMC2 and its memory QME2 and the digital output QDO2. The computer QMC2 is connected to the output QDO2 through universal input-output bus 305. The digital output QDO2 supplies trip-enable status signals through bus 309 to the logic modules 86. It also supplies actuate signals through bust 311 where necessary to the bypass unit 89.

The microprocessor 303 includes the digital input QDI3, the digital output QDO3, the computer QMC3 and its associated memory QME3 and the data-link transceivers QMD5 and QMD6. The transceivers QMD5 and QMD6 operate as a multiplexer for the intelligence being transmitted to remote channels CII-CIV. The digital input QD13 receives bypass status signals from the bypass unit 89 through bus 313, partial trip status signals through bus 315, and bypass signals from the logic modules through bus 317. The partial trip signals in channel CI on trip enable signals when received in channels CII-CIV. Digital output QDO3 supplies global trip status signals through bus 319 and trip bus 88. The flow of intelligence is in both directions in this microprocessor 303; i.e., from channels CII-CIV through multiplexer QMD5 and QMD6 to the bypass unit and from the logic modules 86 and the bypass unit, through the multiplexer QMD5 and QMD6 to channels CII-CIV. The intelligence to and from the computer QMC3 flows through universal input-output bus 307.

The microprocessor 303 essentially includes the components of the communication module 95 (FIG. 3) which is eliminated. The digital output QDO3 is added to provide the two-way communication.

Figure 13:
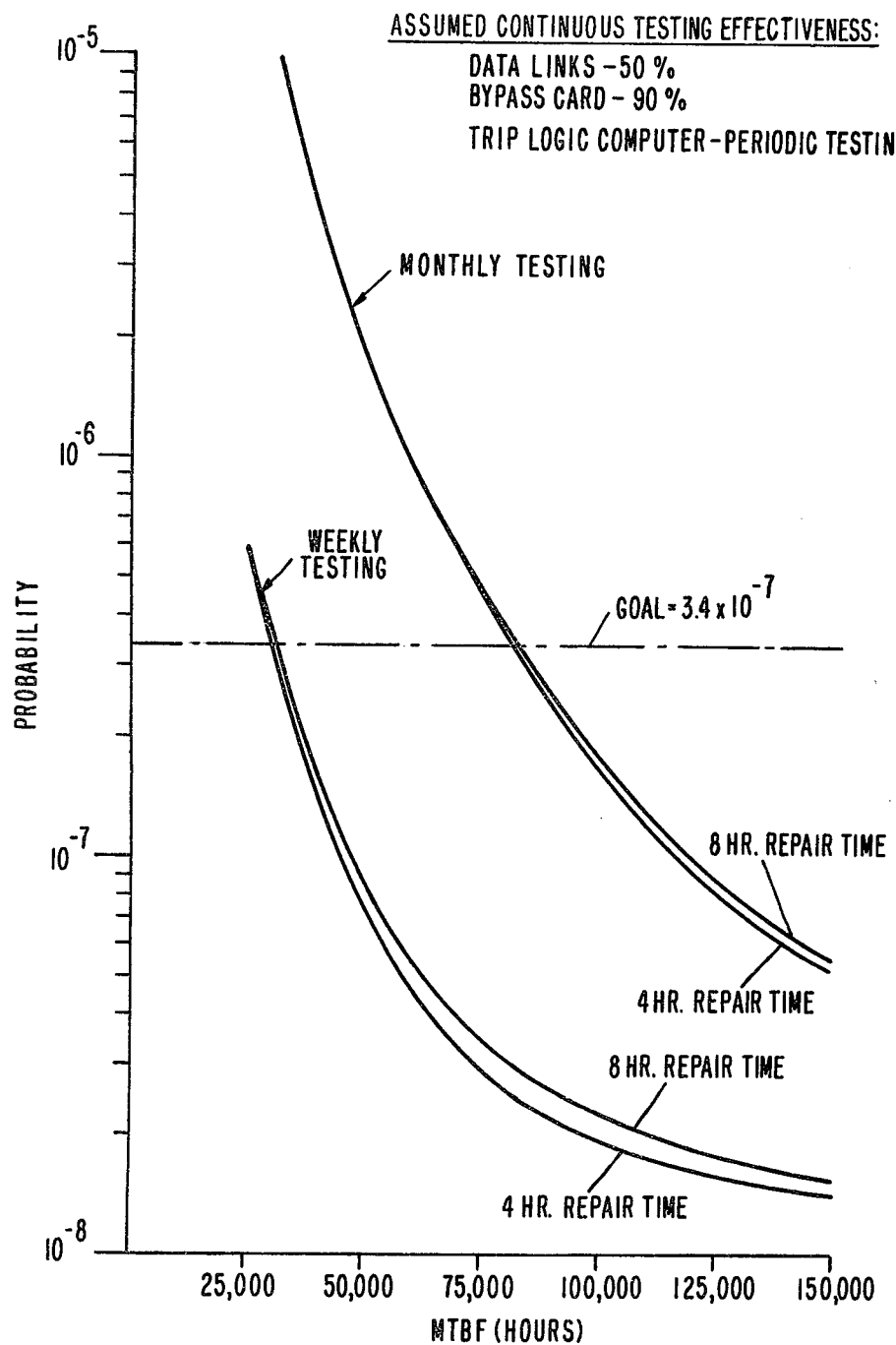
FIG. 13 is a graph showing the result of a parametric reliability study of the computers of the trip logic shown in FIG. 12.

FIG. 13 is a graph showing the result of a parametric reliability study of the trip logic apparatus shown in FIG. 12. Mean times in hours between failures of one computer is plotted horizontally and apparatus reliability in probabilities of failure is plotted vertically. Both weekly testing and monthly were covered.

When a sensor is in test or is subject to maintenance or is defective or disabled, it is bypassed. If only the local sensor of a channel is bypassed, the opening of the breaker controlled by this channel is prevented and the bypassing is signaled. In this case the sensing of an off-normal parameter by at least two of the like sensors of the same set of the other three channels trips the reactor. If both a local and a remote sensor sensing the same parameter of a channel are bypassed, the breaker contacts controlled by this channel are opened. However, the opening of the breaker contactors in another channel, in which the local remote status of the two sensors is reversed, is prevented.

When tripping of a breaker is prevented by bypass of a local sensor, the apparatus operates on a $\frac{2}{3}$, two out of three, configuration. The bypassing of a local and a remote sensor in a channel actually involves two channels. The sensing of an off-normal parameter in a third channel, trips the reactor. When there is a local and a remote bypass in a third channel, the reactor is tripped.

A pulsating signal is injected in each channel to verify the integrity of the bypass responsive parts of the channel.

The apparatus is tested by injecting in each channel a test signal in addition to the pulsating signal and at the same time simulating a local bypass. The signal for a local bypass should not appear. When the test signal is impressed and a remote bypass is simulated, the bypass signal does not appear.

As indicated, the data links and the bypass unit were tested continuously. The effectiveness of the test to detect failures was 50% for the data links and 90% for the bypass unit. The computer was tested periodically. The upper curve in each case represents the situation in which the repair consumed 8 hours; the lower curve the situation in which the repair consumed 4 hours.

The conclusion from the study is that even without continuous testing of the trip logic computer, the reliability of $3.4 \times 10^{-7}$ of the apparatus can be met with W ISD "Q" series card mean time between failures which are in the range of the first estimates of these "Q" series cards.

While preferred embodiments of this invention have been disclosed herein, many modifications thereof are feasible. This invention is not to be restricted except as is necessitated by the spirit of the prior art.

I claim:

1. Power supply apparatus including a nuclear reactor and components cooperative with said reactor for converting the thermal energy generated by said reactor into electrical power, said reactor and said components having a plurality of processes, each process having one or more parameters to be monitored, means connected to said reactor, when actuated, tripping said reactor, a set of like sensors for monitoring each of said parameters, bypass means connected to each of said sensors of each set for bypassing each of said sensors when a sensor is subject to test or maintenance or is defective or disabled or the like, means, responsive to sensing by a first sensor of a set of an off-normal parameter to condition said tripping means to be actuated to trip said reactor, means, responsive to said bypass means, connected to said first sensor, for permitting said conditioning means for said first sensor to condition a trip of said reactor if said first sensor is not bypassed and for disabling said conditioning means for said first sensor from conditioning a trip if said first sensor is bypassed, and means responsive to a second unbypassed sensor of said set, on the sensing by said second sensor of an off-normal parameter, while said first sensor is also unbypassed and senses said off-normal parameter, to trip said reactor.

2. Power supply apparatus including a nuclear reactor and components cooperative with said reactor for converting the thermal energy generated by said reactor into electrical power, said reactor and said components having a plurality of processes, each process having one or more parameters to be monitored, means, connected to said reactor, when actuated tripping said reactor, a plurality of channels, said plurality being herein designated as n in number, each said channel having a sensor, connected to said reactor and/or to said components, for monitoring each of said parameters, there being n like local sensors in the n channels for monitoring each parameter, each said channel including means, when actuated, conditioning said reactor tripping means to be actuated, bypass means connected to each sensor for bypassing said sensor when said sensor is subject to test or maintenance or is defective or disabled or the like, the bypass of a sensor in each channel being herein called a local bypass, means impressing intelligence in each channel of local bypasses of the sensors in the other channels, the local bypass in another channel whose intelligence is impressed in said each channel being herein called a remote bypass with respect to said each channel, means, responsive to the detection of an off-normal parameter by a sensor, for actuating the conditioning means of the channel of said last-named sensor, means, responsive to the actuation of the conditioning means of a plurality, m−1, channels, where m is less than n, for actuating said tripping means to trip said reactor on the actuation of the conditioning means of the mth channel, means, responsive to a local bypass in a channel, for preventing the conditioning means of said channel from being actuated, and means, responsive both to a local bypass of a sensor and a remote bypass of a like sensor in a channel for actuating the conditioning means of said channel.

3. The apparatus of claim 2 wherein m is constant for any parameter when the number of bypassed like sensors for said parameter is less than m and being a number r equal to the number of bypassed like sensors less 1 when the number of bypassed like sensors is equal to or less than m.

4. The apparatus of claim 3 wherein n is equal to 4, m is equal to 2, when the number of bypassed sensors is equal to 0 or 1, and r is equal to 1 or 0 when the number of unbypassed sensors is equal to 2 or 1, respectively.

5. Power supply apparatus including a nuclear reactor and components, cooperative with said reactor, for converting the thermal energy generated by said reactor into electrical power, said reactor and said components having a plurality of processes, each process having one or more parameters to be monitored, means, connected to said reactor, when actuated, tripping said reactor, a plurality of monitoring channels for said parameters, each of said channels having a plurality of sensors, each sensor herein called a local sensor, each of said local sensors being connected to said reactor and/or to said components, for sensing a different one of said parameters, first impressing means, connecting to each of said channels, the like sensors, herein called remote sensors, of the other channels, to impress their sensed signals in said each channel, bypassing means in each channel, cooperative with each local sensor of said channel, for bypassing said each local sensor when said local sensor is subject to test or maintenance or is defective or disabled or the like, impressing means in each channel for impressing, in each of the other channels, intelligence of a bypass of a sensor in said last-named each other channel, said bypass being herein referred to as a remote bypass with respect to said each of said other channels, means, connected to said tripping means, and responsive to the sensing of an off-normal parameter by unbypassed local sensor of a channel and an unbypassed remote sensor of the same set in the same channel for actuating said tripping means to trip said reactor, and means, responsive to the bypassing by said first bypassing means of a local sensor of a channel and to intelligence impressed by said impressing means in said channel of the bypass of a remote sensor of the same set as said local sensor for only conditioning said reactor to be tripped.

6. The apparatus of claim 2 including means in each channel, when enabled, for transmitting a periodic signal through the conditioning means of said channel, said periodic signal being incapable of actuating said conditioning means to condition the trip of said reactor, and means, responsive to the transmission or non-transmission, of said periodic signal through said conditioning means for producing a manifestation distinguishing between the bypassing and the non-bypassing of the local sensor of said channel.

7. The apparatus of claim 2 including means in each channel, when enabled, for transmitting a periodic signal through the conditioning means of said channel, said periodic signal being incapable of actuating said conditioning means, means, responsive to the transmission of said signal through said conditioning means, on the enabling of said transmitting means, for manifesting the absence of a bypassing of the local sensor of said channel, and means, responsive to the bypassing of said local sensor, for preventing the enabling of said transmitting means and the transmission of said periodic signal through said channel thereby manifesting the bypassing of said local sensor.

8. The apparatus of claim 1 including means for generating a periodic signal, means for generating a test signal, means, responsive either to the presence of said test signal, or to the presence of a bypass of the first sensor, for preventing the transmission of said periodic signal through the conditioning means, and to the absence of both, a bypass of said first sensor and the absence of said test signal, for permitting said transmission of said periodic signal, said periodic signal when present being incapable of actuating the conditioning means to condition a trip of said reactor, and means, responsive to the presence of said test signal, for indicating absence of a bypass notwithstanding the presence of a bypass.

9. The method of testing power-supply apparatus including a nuclear reactor and components cooperative with said reactor for converting the thermal energy of said reactor into electrical power, said reactor and said components having a plurality of processes, each process having one or more parameters to be monitored, means, connected to said reactor, when actuated, tripping said reactor, a plurality of monitoring channels for said parameters, each of said channels having a plurality of sensors, connected to said reactor and/or to said components, each for sensing a different one of said parameters, means, in each said channels, connected to said reactor tripping means, when actuated, for conditioning said reactor to trip on the sensing of an off-normal parameter by a sensor or on the bypassing of like sensors in said each channel and in another channel, and means in each channel for indicating the bypass, of a sensor in said channel; the said method testing the operation of a channel and comprising:
(a) generating a pulsating signal;
(b) generating a test signal;
(c) responsive both to the absence of the test signal and to the absence of a bypass of a sensor of said channel, transmitting the pulsating signal through the conditioning means of the channel of said last-named sensor, said transmitted pulsating signal being incapable of actuating said conditioning means to condition a trip but setting the indicating means to indicate absence of a bypass;
(d) response both to the presence of a bypass of said sensor of said channel and the absence of a test signal, preventing the transmission of said pulsating signal thereby setting the indicating means to indicate the presence of a bypass; and
(e) responsive both to the presence of said test signal and the presence of a bypass of said sensor of said channel, setting said indicating means to indicate the absence of a bypass, notwithstanding the presence of a bypass and prevention of the transmission of said pulsating signal.

10. The apparatus of claim 6 including measn, responsive to a trip signal, for preventing the bypass indicating means from indicating a bypass.

11. Power supply apparatus including a nuclear reactor and components cooperative with said reactor for converting the thermal energy of said reactor into electrical power, said reactor and said components having a plurality of processes, each said process having one or more parameters to be monitored, means connected to said reactor, when actuated, for tripping said reactor, a plurality of monitoring channels for said parameters, each of said channels having a plurality of sensors, connected to said reactor and/or to said components, each sensor for sensing a different one of said parameters, each of said channels also included a plurality of relays, each relay connected to one of the sensors of said each channel, each said relay having a contact, a trip bus, a sensor status bus, means connecting said contacts of said relays in parallel between said busses, said contacts of all said relays being open disconnecting said buses in the absence of an off-normal parameter, means responsive to the sensing by at least one sensor of an off-normal parameter, for actuating the relay connected to the sensor to close its contact and connect the trip bus to the sensor status bus, and means, responsive to the connection of said busses, to condition said reactor to be tripped.

12. The apparatus of claim 5 including means, responsive to the sensing by an unbypassed local sensor and a like unbypassed remote sensor of a channel, other than the conditioned channel, while said conditioned channel is conditioned, for tripping said reactor.

13. The apparatus of claim 11 wherein the actuation of each relay is controlled by means including a pair of terminals and also including means for normally impressing a first voltage on each of said terminals such as to maintain said relay unactuated, means, responsive to the sensing of an off-normal parameter by the sensor to which said relay is connected, for impressing on one of said terminals a second voltage conditioning said relay to be actuated, and means, responsive to the sensing of an off-normal parameter by another like sensor for impressing a third voltage of said other terminal, to actuate said relay.

14. The apparatus of claim 13 wherein the relay is connected to a computer, the said apparatus including means, connected to said computer, for impressing on said computer the intelligence that the second voltage has been impressed on the one terminal and also including means, connected to said computer and to the other terminal, and responsive to the intelligence in said computer of the sensing of an off-normal parameter by another sensor of the same set as the one connected to the relay, to impress the third voltage on the other terminal.

15. The apparatus of claim 11 including bypass switch means connected to each relay to maintain said relay unactuated notwithstanding the sensing of an off-normal parameter by the sensor connected to said relay.

16. Power-supply apparatus including a nuclear reactor and components cooperative with said reactor for converting the thermal energy generated by said reactor into electrical energy, said reactor and said components having a plurality of processes, each processes having one or more parameters to be monitored, means, connected to said reactor, when actuated, for tripping said reactor, a plurality of sets of like sensors, the like sensors of each set monitoring a said parameter by sensing said parameter, means for bypassing any of each of said sensors when said any of said each of said sensors is subject to test or maintenances or is defective or disabled or the like, means, connected to said sensors and to said reactor-tripping means and responsive to the sensing by a first sensor of an off-normal parameter, for conditioning said tripping means to trip said reactor, means, connected to said tripping means, responsive to the sensing of an off-normal parameter by a second sensor while said tripping means is conditioned as aforesaid, for tripping said reactor, means, responsive to the bypassing of only said second sensor by said bypassing means, while said reactor tripping means is so conditioned, for preventing the tripping of said reactor, and means, responsive to the bypassing of another sensor of the same set as said second sensor in addition to said second sensor, while said tripping means is so conditioned, for tripping said reactor.

17. The apparatus of claim 16 including means, responsive to the bypassing of a sensor, for distinguishing between the bypassing and the non-bypassing of a sensor.

18. The apparatus of claim 1 including means for transmitting trains of a plurality of pulses each, periodically through said tripping means so long as a sensor is not bypassed and also including means, responsive to the bypassing of a sensor, for interrupting the transmission of said pulses, and means, responsive to said interruption, for distinguishing between the bypassing and the non-bypassing of a sensor.

19. Power-supply apparatus including a nuclear reactor and components for converting the thermal energy generated by said reactor into electrical power, said reactor and said components having a plurality of processes, each process having one or more parameters to be monitored, means, connected to said reactor, when actuated, for tripping said reactor, a set of like sensors, connected to said reactor and/or to said components, for monitoring each of said parameters, a plurality of channels, each channel herein called a local channel, including a sensor, herein called a local sensor of each set, means connected to the sensors or the other channels, herein called remote channels, for impressing the signals sensed by the sensors, herein called remote sensors, included in the remote channels, on each local channel, each said local channel including means for processing the signals sensed by said local and remote sensors, the said processing means including in each channel:

(a) means conditioning said reactor tripping means to trip on the sensing by a sensor of an off-normal parameter, the said conditioning being herein referred to as a partial trip;
(b) a logic computer having a first processor and a second processor, the said signals from the remote sensors being impressed on and received by said computer;
(c) a logic module for each set of sensors;
(d) a trip module for each set of sensors;
(e) a connection between each trip module and the logic module of the same set for transmitting the intelligence of a partial trip of a local sensor to said last-named logic module;
(f) a connection between the first processor and each logic module for transmitting to said last-named logic module intelligence of a trip enable resulting from partial trip of a remote module of the set of said last-named logic module; and
(g) a connection between said second processor and said reactor-trip-conditioning means for transmitting intelligence of a global trip of a remote channel to said reactor-trip-conditioning means.

20. The apparatus of claim 19 wherein the signals from the remote sensors are impressed in parallel both in the first processor and on the second processor.

21. The apparatus of claim 19 wherein the signals from the remote sensors are impressed on each, the first processor and the second processor, through isolated data links.

22. The apparatus of claim 20 including a connection between the local channel, the second processor and the remote channels for transmitting the status of a local channel to the remote channels.

23. The apparatus of claim 2 including means, responsive both to:

(a) the impressing in a first channel of a remote bypass (said remote bypass signifying a local bypass in a second channel); and
(b) the impressing of a local bypass in said first channel, for preventing the impressing of the intelligence of said last-named local bypass as a remote bypass in said second channel thereby preventing the actuation of said conditioning means.

24. Power-supply apparatus including a nuclear reactor and components, cooperative with said reactor, for converting the thermal energy generated by said reactor into electrical power, said reactor and said components having a plurality of processes, each process having one or more parameters, to be monitored, means, connected to said reactor, when actuated, tripping said reactor, a set of like sensors for monitoring each of said parameters, means connected to each sensor of a set, actuable on the sensing by said sensor of an off-normal parameter, to condition said tripping means to trip said reactor, bypass means connected to each of said sensors, to bypass any of said each of said sensors when said any of said each of said sensors is subject to test or maintenance or is defective or disabled or the like, means for generating a pulsating signal, gate means having an input and an output, means for impressing said pulsating signal on said input, means connecting said output to said conditioning means, said gate means when open permitting the flow of said pulsating signal to said conditioning means and when closed preventing the flow of said pulsating signal to said conditioning means, means connecting the bypass means to the gate means, for controlling the transmission of said pulsating signal, from said generating means through said conditioning means, in dependence upon the presence or absence of a bypass about a sensor, and means, responsive to the conduction or non-conduction by said conditioning means of said pulsating signal, for distinguishing between the presence or absence of a bypass, said pulsating signal being incapable of actuating said conditioning means.

25. The apparatus of claim 24 including means for generating a test signal, means for impressing said test signal on the gate means in addition to the pulsating signal, and means, responsive to the said test signal when impressed, for reversing the response of the controlling means to the presence or absence of a bypass.

26. Control apparatus including a relay, a computer having a memory, a power supply, means for connecting said supply to said relay for energizing said relay, said connecting means including a first conductor and a second conductor, both said conductors being normally connected to said supply, said relay being in energized condition when either conductors is connected to said supply, means, responsive to the occurrence of a first event, for disconnecting said first conductor from said supply to condition said relay to be deenergized, means connected to said computer and responsive to the disconnection of said first conductor for signaling said computer intelligence of the disconnection of said first conductor, and means responsive to the presence of intelligence of a second event in the memory of said computer when said computer is signalled as aforesaid, for disconnecting said second conductor from said supply to deenergize said relay.

27. Test apparatus for a computer including means for generating pulses of high and low magnitude, means impressing said pulses in the input of said computer, said computer desirably to deliver a pulse of predetermined configuration to its output responsive to each pulse impressed on its input, a timer, means connected to said generating means and to said timer and responsive to each pulse generated by said generating means, for initiating the timing of said timer as each pulse is impressed on said input, means connected to said output and to said timer, for terminating the timing of said timer on the delivery of said pulse of predetermined configuration at said output, and means responsive to the failure undesirably by said computer to deliver a said pulse of said predetermined configuration to its output within a predetermined interval after the corresponding pulse from the generator has been delivered to its input, to produce a manifestation of said failure.

28. The apparatus of claim 27 wherein the pulses generated by the timer are of at least as long a duration as the predetermined interval.

29. Power-supply apparatus including a nuclear reactor and components cooperative with said reactor for converting the thermal energy generated by said reactor into electrical power, said reactor and said components having a plurality of processes, each process having one or more parameters to be monitored, means, connected to said reactor, when actuated, tripping said reactor, a set of like sensors for monitoring each of said parameters, bypass means connected to each of said sensors of each set, for bypassing any of each of said sensors when a said any sensor is subject to test or maintenance or is defective or disabled or the like, and means, responsive to said sensors on the occurrence only of any one of the following events, for actuating said tripping means to trip said reactor:
  (a) the sensing of an off-normal parameter by at least two sensors of the set sensing said parameter;
  (b) the sensing of an off-normal parameter by only one of the sensors of a set sensing said parameter and the bypassing of at least two other sensors of the same set;
  (c) the bypassing of at least three sensors of a set; and also including means responsive to the sensors, for preventing the actuation of the tripping means on the occurrence of any of the following events:
  (a) the sensing of off-normal parameters by only one each of sensors of different sets;
  (b) the sensing of off-normal parameters by only one each of a plurality of sensors of different sets and the bypassing of only one sensor of each of said last-named sets;
  (c) the bypassing of not more than two sensors of the same set.

30. Power-supply apparatus including a nuclear reactor and components cooperative with said reactor for converting the thermal energy generated by said reactor into electrical power, said reactor and said components having a plurality of processes, each of said processes having one or more parameters to be monitored, means, connected to said reactor, when actuated, tripping said reactor, a set of like sensors for monitoring each of said parameters, bypass means, connected to each of said sensors, for bypassing the sensor to which it is connected when said last-named sensor is in a condition requiring bypass, a plurality of channels, each channel associated with one each of the like sensors of the sets, each channel including means for conditioning said reactor-tripping means to trip said reactor, means, connecting each sensor associated with a channel, (herein called local sensor), and each sensor associated with the other channels, (herein called remote sensor) in controlling relationship with said conditioning means of its local channel such that when a local sensor senses an off-normal parameter, said conditioning means, is conditioned to trip said reactor, means, responsive to the bypass of a local sensor, for disabling the controlling means of its local channel from conditioning the conditioning means to condition as aforesaid, means, responsive to the bypassing of said local sensor, for transmitting to all remote channels intelligence of the bypass of said local sensor, means, responsive to a bypass of a remote sensor and also a bypass of a local sensor for disabling the transmitting means of the local channel so that the intelligence of the bypass of the local sensor is not transmitted to the remote channels, and means, responsive to intelligence of a bypass of a remote sensor and also to bypass of the local sensor, for conditioning the tripping of said reactor by the conditioning means of said local channel.

31. The method of testing power-supply apparatus including a nuclear reactor and components cooperative with said reactor for converting the thermal energy of said reactor into electrical power, said reactor and said components having a plurality of processes, each process having one or more parameters to be monitored, means, connected to said reactor and/or to said components, when actuated, tripping said reactor, a plurality of monitoring channels for said parameters, each of said channels having a plurality of sensors, connected to said reactor and/or to said components, each for sensing a different one of said parameters, means, in each of said channels, connected to said tripping means, when actuated, for conditioning said reactor to trip on the sensing of an off-normal parameter by a sensor or on the bypassing of like sensors in said each channel and in another channel, and means, in each channel, for indicating the bypass of a sensor in said channel; the said method testing the operation of a channel and comprising:
  (a) generating a test signal;
  (b) responsive, both, to the absence of said test signal and to the absence of bypass of a sensor of said channel, setting said indicating means to indicate the absence of said bypass;
  (c) responsive, both, to the presence of a bypass of said sensor of said channel and the absence of said test signal, setting said indicating means to indicate the presence of said bypass; and
  (d) responsive, both, to the presence of said test signal and to the presence of a bypass of said sensor of said channel, setting said indicating means to indicate the absence of said bypass notwithstanding its presence.

32. The method of claim 31 wherein the bypass recited in subparagraph (d) of claim 37 is a simulated bypass.

* * * * *